US012266301B2

(12) United States Patent
Han et al.

(10) Patent No.: US 12,266,301 B2
(45) Date of Patent: Apr. 1, 2025

(54) PIXEL CIRCUIT AND DRIVING METHOD THEREFOR, DISPLAY SUBSTRATE, AND DISPLAY APPARATUS

(71) Applicant: BOE TECHNOLOGY GROUP CO., LTD., Beijing (CN)

(72) Inventors: Seungwoo Han, Beijing (CN); Haoliang Zheng, Beijing (CN); Li Xiao, Beijing (CN); Dongni Liu, Beijing (CN); Liang Chen, Beijing (CN); Hao Chen, Beijing (CN); Jiao Zhao, Beijing (CN); Minghua Xuan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/772,029

(22) PCT Filed: Jun. 30, 2021

(86) PCT No.: PCT/CN2021/103341

§ 371 (c)(1),
(2) Date: Apr. 26, 2022

(87) PCT Pub. No.: WO2023/272540

PCT Pub. Date: Jan. 5, 2023

(65) Prior Publication Data

US 2024/0395197 A1 Nov. 28, 2024

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0852* (2013.01);
(Continued)

(58) Field of Classification Search
CPC ............... G09G 3/3233; G09G 3/2007; G09G 2300/0852; G09G 2300/0861;
(Continued)

(56) References Cited

U.S. PATENT DOCUMENTS

2016/0260379 A1 9/2016 Jeon
2016/0275854 A1 9/2016 Wang et al.
(Continued)

FOREIGN PATENT DOCUMENTS

CN 104599634 A 5/2015
CN 107731143 A 2/2018
(Continued)

OTHER PUBLICATIONS

Taiwanese Office Action (w/ English translation) for corresponding Taiwanese Application No. 110138679, 6 pages.
(Continued)

*Primary Examiner* — Dennis P Joseph
(74) *Attorney, Agent, or Firm* — Dority & Manning, P.A.

(57) ABSTRACT

A pixel circuit includes a first driving circuit, a first control circuit, a second driving circuit and a second control circuit. The first driving circuit is configured to write a first data signal into a first node in response to a scanning signal. The first control circuit is configured to transmit a first voltage signal to the first driving circuit, and transmit a first driving signal generated by the first driving circuit according to a voltage of the first node and the first voltage signal in response to an enable signal. The second driving circuit is configured to write a second data signal into a second node in response to the scanning signal. The second control circuit is configured to transmit a second driving signal generated by the second driving circuit according to a voltage of the second node and the first voltage signal in response to a control signal.

20 Claims, 11 Drawing Sheets

(52) U.S. Cl.
CPC . *G09G 2300/0861* (2013.01); *G09G 2310/08* (2013.01); *G09G 2320/0233* (2013.01); *G09G 2320/0242* (2013.01); *G09G 2320/0247* (2013.01); *G09G 2330/021* (2013.01)

(58) Field of Classification Search
CPC ....... G09G 2310/08; G09G 2320/0233; G09G 2320/0242; G09G 2310/0286
See application file for complete search history.

(56) References Cited

U.S. PATENT DOCUMENTS

| | | | | |
|---|---|---|---|---|
| 2018/0130410 | A1* | 5/2018 | Gao | G09G 3/3225 |
| 2018/0350286 | A1 | 12/2018 | Lee et al. | |
| 2019/0325824 | A1 | 10/2019 | Chen et al. | |
| 2020/0243009 | A1* | 7/2020 | Li | G09G 3/3233 |
| 2020/0394953 | A1 | 12/2020 | Kim et al. | |
| 2021/0097931 | A1 | 4/2021 | Yue et al. | |
| 2021/0193691 | A1* | 6/2021 | Lee | G09G 3/3233 |
| 2021/0407429 | A1* | 12/2021 | Seo | G09G 3/3233 |
| 2024/0194153 | A1* | 6/2024 | Kim | G09G 3/3233 |

FOREIGN PATENT DOCUMENTS

| | | | |
|---|---|---|---|
| CN | 109559679 | A | 4/2019 |
| CN | 110491338 | A | 11/2019 |
| CN | 111261098 | A | 6/2020 |
| CN | 111402802 | A | 7/2020 |
| CN | 111429834 | A | 7/2020 |
| CN | 112017597 | A | 12/2020 |
| CN | 112562579 | A | 3/2021 |
| CN | 112562589 | A | 3/2021 |
| CN | 112785969 | A | 5/2021 |
| TW | 202115703 | A | 4/2021 |

OTHER PUBLICATIONS

Chinese Office Action (w/ English translation) for corresponding Application No. 202180001727.X, dated Nov. 7, 2024, 20 pages.

* cited by examiner

PIXEL CIRCUIT AND DRIVING METHOD THEREFOR, DISPLAY SUBSTRATE, AND DISPLAY APPARATUS

CROSS-REFERENCE TO RELATED APPLICATION

The present application is a national phase entry under 35 USC 371 of International Patent Application No. PCT/CN2021/103341, filed on Jun. 30, 2021, which is incorporated herein by reference in its entirety.

TECHNICAL FIELD

The present disclosure relates to the field of display technologies, and in particular, to a pixel circuit and a driving method therefor, a display substrate, and a display apparatus.

BACKGROUND

Due to numerous advantages such as self-luminescence, high efficiency, high brightness, high reliability, energy conservation and quick response, light-emitting diodes (LEDs) have been widely used in fields such as conventional display, near-eye display, three-dimensional (3D) display and transparent display.

SUMMARY

In one aspect, a pixel circuit is provided. The pixel circuit includes a first driving circuit, a first control circuit, a second driving circuit and a second control circuit. The first driving circuit is electrically connected to at least a scanning signal terminal, a first data signal terminal, a first voltage signal terminal and a first node. The first driving circuit is configured to write a first data signal received at the first data signal terminal into the first node in response to a scanning signal received at the scanning signal terminal. The first control circuit is electrically connected to an enable signal terminal, the first voltage signal terminal and the first driving circuit. The first control circuit is configured to be further electrically connected to a light-emitting device. The first control circuit is further configured to transmit a first voltage signal from the first voltage signal terminal to the first driving circuit, and to transmit a first driving signal generated by the first driving circuit according to a voltage of the first node and the first voltage signal transmitted by the first voltage terminal to the light-emitting device in response to an enable signal received at the enable signal terminal. The second driving circuit is electrically connected to at least the scanning signal terminal, a second data signal terminal, a second node and the first voltage signal terminal. The second driving circuit is configured to write a second data signal received at the second data signal terminal into the second node in response to the scanning signal. The second control circuit is electrically connected to a control signal terminal and the second driving circuit. The second control circuit is configured to be further electrically connected to the light-emitting device. The second control circuit is further configured to transmit a second driving signal generated by the second driving circuit according to a voltage of the second node and the first voltage signal from the first voltage signal terminal to the light-emitting device in response to a control signal received at the control signal terminal.

In some embodiments, the second driving circuit includes a second data writing circuit and a second driving sub-circuit. The second data writing circuit is electrically connected to the scanning signal terminal, the second data signal terminal and the second node. The second data writing circuit is configured to write the second data signal into the second node in response to the scanning signal. The second driving sub-circuit is electrically connected to the second node, a third node and the first voltage signal terminal. The second driving sub-circuit is configured to generate the second driving signal according to the voltage of the second node and the first voltage signal from the first voltage signal terminal, and to transmit the second driving signal to the third node under control of the voltage of the second node.

In some embodiments, the second data writing circuit includes a first transistor. A control electrode of the first transistor is electrically connected to the scanning signal terminal, a first electrode of the first transistor is electrically connected to the second data signal terminal, and a second electrode of the first transistor is electrically connected to the second node.

In some embodiments, the second driving sub-circuit includes a second transistor and a first capacitor. A control electrode of the second transistor is electrically connected to the second node, a first electrode of the second transistor is electrically connected to the first voltage signal terminal, and a second electrode of the second transistor is electrically connected to the third node. A first electrode of the first capacitor is electrically connected to the second node, and a second electrode of the first capacitor is electrically connected to the first voltage signal terminal.

In some embodiments, the second control circuit includes a third transistor. A control electrode of the third transistor is electrically connected to the control signal terminal, a first electrode of the third transistor is electrically connected to a third node, and a second electrode of the third transistor is configured to be electrically connected to the light-emitting device.

In some embodiments, the first driving circuit includes a first reset circuit, a first data writing circuit, a first driving sub-circuit and a compensation circuit. The first reset circuit is electrically connected to a reset signal terminal, the first node and a second voltage signal terminal; the first reset circuit is configured to transmit a second voltage signal received at the second voltage signal terminal to the first node in response to a reset signal received at the reset signal terminal. The first data writing circuit is electrically connected to the scanning signal terminal, the first data signal terminal and a fourth node; the first data writing circuit is configured to write the first data signal into the fourth node in response to the scanning signal. The first driving sub-circuit is electrically connected to the fourth node, a fifth node, the first node and the first voltage signal terminal. The compensation circuit is electrically connected to the scanning signal terminal, the fifth node and the first node; the compensation circuit is configured to electrically connect the fifth node to the first node in response to the scanning signal. The first driving sub-circuit is configured to transmit the first data signal received at the fourth node to the first node when the fifth node is electrically connected to the first node, and store the voltage of the first node; and the first driving sub-circuit is further configured to generate the first driving signal according to the voltage of the first node and the first voltage signal transmitted to the fourth node.

In some embodiments, the first reset circuit includes a fourth transistor. A control electrode of the fourth transistor is electrically connected to the reset signal terminal, a first electrode of the fourth transistor is electrically connected to the second voltage signal terminal, and a second electrode of the fourth transistor is electrically connected to the first node.

In some embodiments, the first data writing circuit includes a fifth transistor. A control electrode of the fifth transistor is electrically connected to the scanning signal terminal, a first electrode of the fifth transistor is electrically connected to the first data signal terminal, and a second electrode of the fifth transistor is electrically connected to the fourth node.

In some embodiments, the first driving sub-circuit includes a sixth transistor and a second capacitor. A control electrode of the sixth transistor is electrically connected to the first node, a first electrode of the sixth transistor is electrically connected to the fourth node, and a second electrode of the sixth transistor is electrically connected to the fifth node. A first electrode of the second capacitor is electrically connected to the first node, and a second electrode of the second capacitor is electrically connected to the first voltage signal terminal.

In some embodiments, the compensation circuit includes a seventh transistor. A control electrode of the seventh transistor is electrically connected to the scanning signal terminal, a first electrode of the seventh transistor is electrically connected to the fifth node, and a second electrode of the seventh transistor is electrically connected to the first node.

In some embodiments, the first control circuit includes an eighth transistor and a ninth transistor. A control electrode of the eighth transistor is electrically connected to the enable signal terminal, a first electrode of the eighth transistor is electrically connected to a fifth node, and a second electrode of the eighth transistor is configured to be electrically connected to the light-emitting device. A control electrode of the ninth transistor is electrically connected to the enable signal terminal, a first electrode of the ninth transistor is electrically connected to the first voltage signal terminal, and a second electrode of the ninth transistor is electrically connected to the fourth node.

In some embodiments, the pixel circuit further includes a second reset circuit. The second reset circuit is electrically connected to a reset signal terminal and a second voltage signal terminal. The second reset circuit is configured to be further electrically connected to the light-emitting device, and to transmit a second voltage signal received at the second voltage signal terminal to the light-emitting device in response to a reset signal received at the reset signal terminal.

In some embodiments, the second reset circuit includes a tenth transistor. A control electrode of the tenth transistor is electrically connected to the reset signal terminal, a first electrode of the tenth transistor is electrically connected to the second voltage signal terminal, and a second electrode of the tenth transistor is configured to be electrically connected to the light-emitting device.

In some embodiments, the pixel circuit includes a plurality of transistors, and the plurality of transistors are of a same type.

In some embodiments, the plurality of transistors are all oxide transistors.

In another aspect, a driving method for a pixel circuit, which is applied to the pixel circuit according to any one of the above embodiments, is provided. The driving method includes: in response to the scanning signal received at the scanning signal terminal, the first driving circuit being turned on, and writing the first data signal received at the first data signal terminal into the first node; and in response to the enable signal received at the enable signal terminal, the first control circuit being turned on, and transmitting the first voltage signal from the first voltage signal terminal to the first driving circuit, and transmitting the first driving signal generated by the first driving circuit according to the voltage of the first node and the first voltage signal transmitted by the first voltage signal terminal to the light-emitting device, so as to control a light-emitting brightness of the light-emitting device; and/or, in response to the scanning signal received at the scanning signal terminal, the second driving circuit being turned on and writing the second data signal received at the second data signal terminal into the second node; and in response to the control signal received at the control signal terminal, the second control circuit being turned on, and transmitting the second driving signal generated by the second driving circuit according to the voltage of the second node and the first voltage signal transmitted by the first voltage signal terminal to the light-emitting device, so as to control the light-emitting brightness and a light-emitting duration of the light-emitting device.

In some embodiments, the first driving circuit includes: a first reset circuit electrically connected to a reset signal terminal, the first node and a second voltage signal terminal, a first data writing circuit electrically connected to the scanning signal terminal, the first data signal terminal and a fourth node, a first driving sub-circuit electrically connected to the fourth node, a fifth node, the first node and the first voltage signal terminal, and a compensation circuit electrically connected to the scanning signal terminal, the fifth node and the first node. The driving method further includes: in response to a reset signal received at the reset signal terminal, the first reset circuit being turned on, and transmitting a second voltage signal received at the second voltage signal terminal to the first node. The first driving circuit writing the first data signal received at the first data signal terminal into the first node and generating the first driving signal according to the voltage of the first node and the first voltage signal, includes: in response to the scanning signal, the first data writing circuit being turned on, and writing the first data signal to the fourth node; in response to the scanning signal, the compensation circuit being turned on, and making the fifth node to be connected to the first node, so that the first data signal received at the fourth node is transmitted to the first node; and under control of the voltage of the first node, the first driving sub-circuit being turned on, and generate the first driving signal according to the voltage of the first node and the first voltage signal transmitted to the fourth node.

In some embodiments, a range of a voltage value of the first data signal is same as a range of a voltage value of the second data signal.

In yet another aspect, a display substrate is provided. The display substrate includes a plurality of pixel circuits each according to any one of the above embodiments, and a light-emitting device electrically connected to each pixel circuit.

In yet another aspect, a display apparatus is provided. The display apparatus includes the display substrate according to any one of the above embodiments.

In some embodiments, the display apparatus further includes a source driver chip. The source driver chip is electrically connected to the first data signal terminal and the second data signal terminal.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, an actual process of a method and actual timings of signals to which the embodiments of the present disclosure relate.

DETAILED DESCRIPTION

Figure 1:
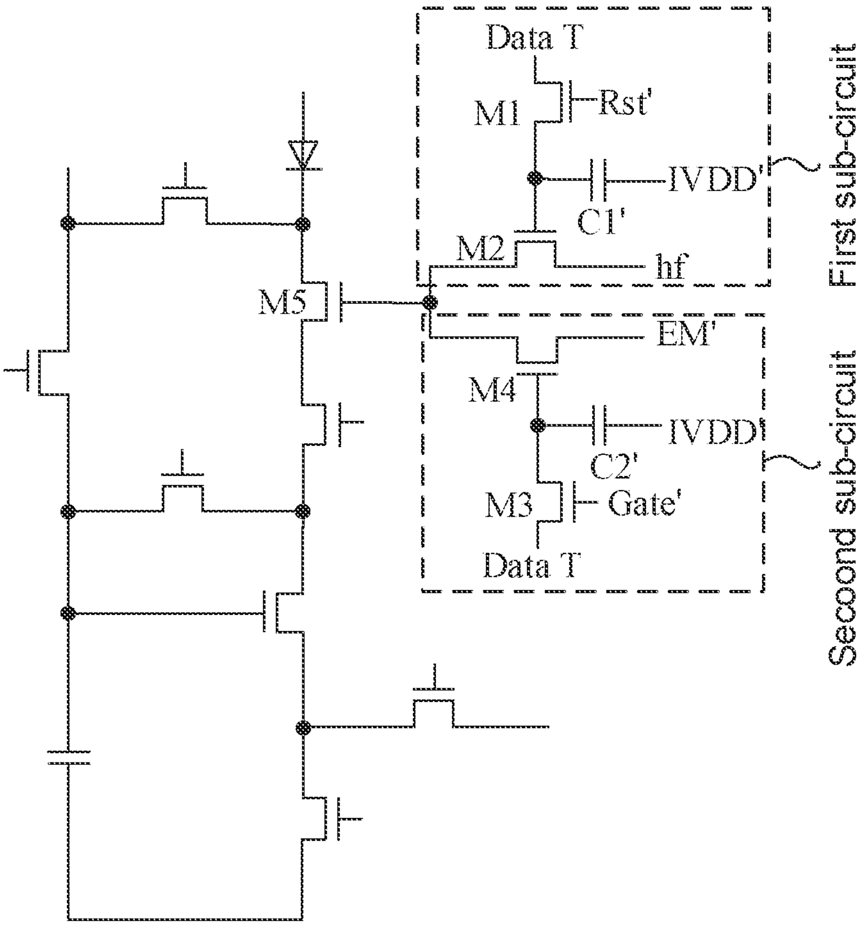
FIG. 1 is a structural diagram of a pixel circuit, in accordance with the related art.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description, the term such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of" means two or more unless otherwise specified.

In the description of some embodiments, the term "connected" and derivatives thereof may be used. For example, the term "connected" may be used in the description of some embodiments to indicate that two or more components are in direct physical or electrical contact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when", "in a case where", "in response to determining", or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

Transistors used in circuits provided by the embodiments of the present disclosure may be thin film transistors, field effect transistors, or other switching devices with same characteristics. The embodiments of the present disclosure will all be described by taking an example in which the transistors are the thin film transistors.

In some embodiments, a control electrode of each transistor used in a pixel circuit is a gate of the transistor, a first electrode of the transistor is one of a source and a drain of the transistor, and a second electrode of the transistor is the other one of the source and the drain of the transistor. Since the source and the drain of the transistor may be symmetrical in structure, there may be no difference in structure between the source and the drain of the transistor. That is to say, there may be no difference in structure between the first electrode and the second electrode of the transistor in the embodiments of the present disclosure. For example, in a case where the transistor is a P-type transistor, the first electrode of the transistor is the source, and the second electrode of the transistor is the drain. For example, in a case where the transistor is an N-type transistor, the first electrode of the transistor is the drain, and the second electrode of the transistor is the source.

In the circuits provided by the embodiments of the present disclosure, the "node" does not represent an actual component, but rather represents a junction of related electrical connections in a circuit diagram. That is, the node is a point that is equivalent to the junction of the related electrical connections in the circuit diagram.

It will be noted that, turn-on types of the transistors in the circuits provided by the embodiments of the present disclosure are same. The transistors in the circuits below being of the same turn-on type may simplify a process flow, reduce a process difficulty, and improve yields of products (e.g., a pixel circuit and a display apparatus).

Hereinafter, a description will be given by taking an example in which the transistors in the circuits provided by the embodiments of the present disclosure are all N-type transistors.

Sensitivities of a cerebral cortex and an optic nerve of a human being to flicker are approximately 160 Hz, and a sensitivity of a retina to the flicker is approximately 200 Hz. Therefore, although a dimming frequency of numerous light-emitting devices is approximately 250 Hz, a few people may still feel uncomfortable, resulting in headache, irritability and tinnitus.

Therefore, in order to avoid discomfort of a user, in a pixel circuit in the related art, a high-frequency signal may be provided to control the dimming frequency of the light-emitting devices. Considering the pixel circuit (e.g., with a 12T3C structure) shown in FIG. 1 as an example, the pixel circuit includes a first sub-circuit and a second sub-circuit. The first sub-circuit includes a first transistor M1, a second transistor M2 and a first storage capacitor C1'. The second sub-circuit includes a third transistor M3, a fourth transistor M4 and a storage capacitor C2'. The pixel circuit may further include a fifth transistor M5.

Figure 2:
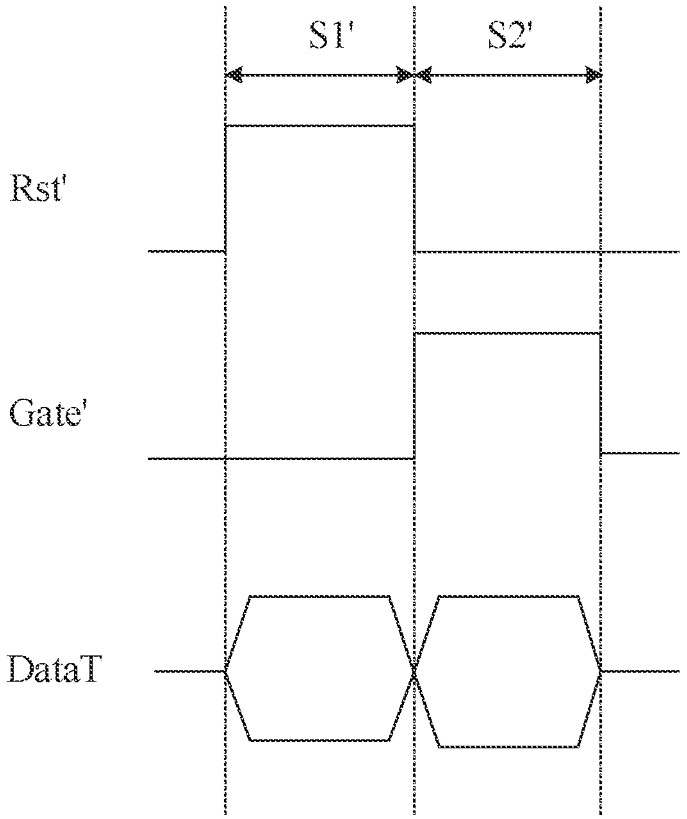
FIG. 2 is an operation timing diagram of a pixel circuit, in accordance with the related art.

For example, as shown in FIG. 2, in a case where the pixel circuit operates in a low gray scale range, operation processes of the first sub-circuit and the second sub-circuit in the pixel circuit each include a first phase S1' and a second phase S2'.

In the first phase S1', a data signal transmitted by a data signal terminal DataT is at a high level, a reset signal transmitted by a reset signal terminal Rst' is at a high level, and a scanning signal transmitted by a scanning signal terminal Gate' is at a low level.

Under control of the reset signal, the first transistor M1 transmits the data signal to a control electrode of the second transistor M2, and charges the first storage capacitor C1'. The second transistor M2 is turned on under control of the data signal, and transmits a high-frequency signal received at a high-frequency signal terminal hf to a control electrode of the fifth transistor M5. The third transistor M3 is turned off under control of the scanning signal, so that the data signal is prevented from being transmitted to a control electrode of the fourth transistor M4, and in turn, the fourth transistor M4 is turned off, and an enable signal transmitted by an enable signal terminal EM' is prevented from being transmitted to the control electrode of the fifth transistor M5.

In the second phase S2', the data signal is at a low level, the reset signal is at a low level, and the scanning signal is at a high level.

The first transistor M1 is turned off under the control of the reset signal, and the first storage capacitor C1' starts to discharge, so that the second transistor M2 is maintained in a turn-on state, and continuously transmits the high-frequency signal to the control electrode of the fifth transistor M5. The third transistor M3 transmits the data signal to the control electrode of the fourth transistor M4 under the control of the scanning signal, so that the fourth transistor M4 is maintained in a turn-off state under the control of the data signal, and the enable signal is prevented from being transmitted to the control electrode of the fifth transistor M5.

For example, as shown in FIG. 2, in a case where the pixel circuit operates in medium and high gray scale ranges, the operation processes of the first sub-circuit and the second sub-circuit in the pixel circuit each include a first phase S1' and a second phase S2'.

In the first phase S1', the data signal is at a low level, the reset signal is at a high level, and the scanning signal is at a low level.

The first transistor M1 transmits the data signal to the control electrode of the second transistor M2 under the control of the reset signal. The second transistor M2 is turned off under the control of the data signal, so that the high-frequency signal is prevented from being transmitted to the control electrode of the fifth transistor M5. The third transistor M3 is turned off under the control of the scanning signal.

In the second phase S2', the data signal is at a high level, the reset signal is at a low level, and the scanning signal is at a high level.

The first transistor M1 is turned off under the control of the reset signal, so that the data signal is prevented from being transmitted to the control electrode of the second transistor M2, and in turn, the second transistor M2 is in a turn-off state, and the high-frequency signal is prevented from being transmitted to the control electrode of the fifth transistor M5. The third transistor M3 is turned on under the control of the scanning signal, and transmits the data signal to the control electrode of the fourth transistor M4, so that the fourth transistor M4 is turned on under the control of the data signal, and transmits the enable signal to the control electrode of the fifth transistor M5.

It can be seen from the above that, in the case where the pixel circuit operates in the low gray scale range, the first sub-circuit operates, and the fifth transistor M5 may be turned on and turned off alternately at a high frequency under control of the high-frequency signal, so that a light-emitting device may emit light and not emit light alternately at a high frequency. As a result, it is possible to effectively improve a dimming frequency of the light-emitting device, and to relieve or even eliminate the discomfort of the user.

It can be understood that, the first sub-circuit and the second sub-circuit operate in different gray scale ranges. That is, in the low gray scale range, the first sub-circuit operates, while the second sub-circuit does not operate; in the medium and high gray scale ranges, the second sub-circuit operates, while the first sub-circuit does not operate.

Operating states of the first sub-circuit and the second sub-circuit are determined by the data signal. The signal transmitted to the control electrode of the fifth transistor M5 may only be selected from the high-frequency signal and the enable signal (i.e., only one of the first sub-circuit and the second sub-circuit may operate at a same time), and thus, if the operating states of the first sub-circuit and the second sub-circuit are changed, the level of the data signal must be switched once between the high level and the low level. Therefore, in the related art, with regard to a plurality of pixel circuits electrically connected to a same gate line, even if data voltages required for the pixel circuits are all very small, power consumption of the pixel circuits is still very high.

Based on this, some embodiments of the present disclosure provide a pixel circuit and a driving method therefor, a display substrate and a display apparatus. Hereinafter, the pixel circuit and the driving method therefor, the display substrate and the display apparatus will be schematically described.

Figure 3:
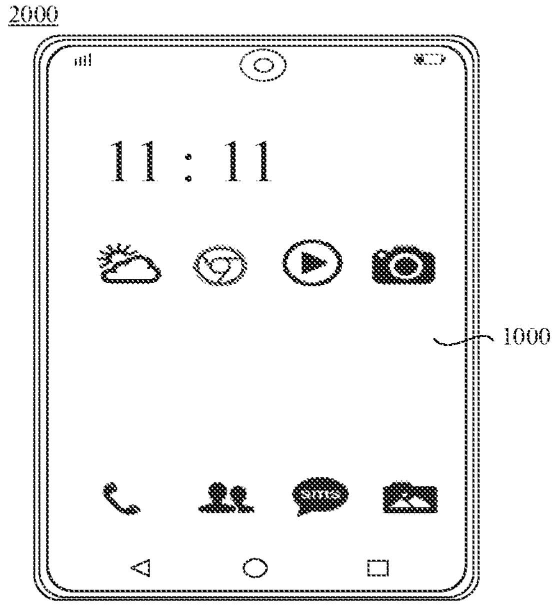
FIG. 3 is a structural diagram of a display apparatus, in accordance with some embodiments of the present disclosure.

In some embodiments, as shown in FIG. 3, some embodiments of the present disclosure provide a display apparatus 2000. The display apparatus 2000 may be any apparatus that displays an image whether in motion (e.g., a video) or stationary (e.g., a still image), and whether textual or graphical. More specifically, the display apparatus may be one of a variety of electronic devices, and the described embodiments may be implemented in or associated with the variety of electronic devices. The variety of electronic devices may include (but are not limit to), for example, mobile telephones, wireless devices, personal digital assistants (PDA), hand-held or portable computers, global positioning system (GPS) receivers/navigators, cameras, MPEG-4 Part 14 (MP4) video players, video cameras, game consoles, watches, clocks, calculators, television (TV) monitors, flat-panel displays, computer monitors, car displays (e.g., odometer displays), navigators, cockpit controllers and/or displays, camera view displays (e.g., display of rear view camera in vehicles), electronic photos, electronic billboards or signs, projectors, architectural structures, packaging and aesthetic structures (e.g., a display for an image of a piece of jewelry). The embodiments of the present disclosure do not particularly limit a specific form of the display apparatus.

Figure 4:
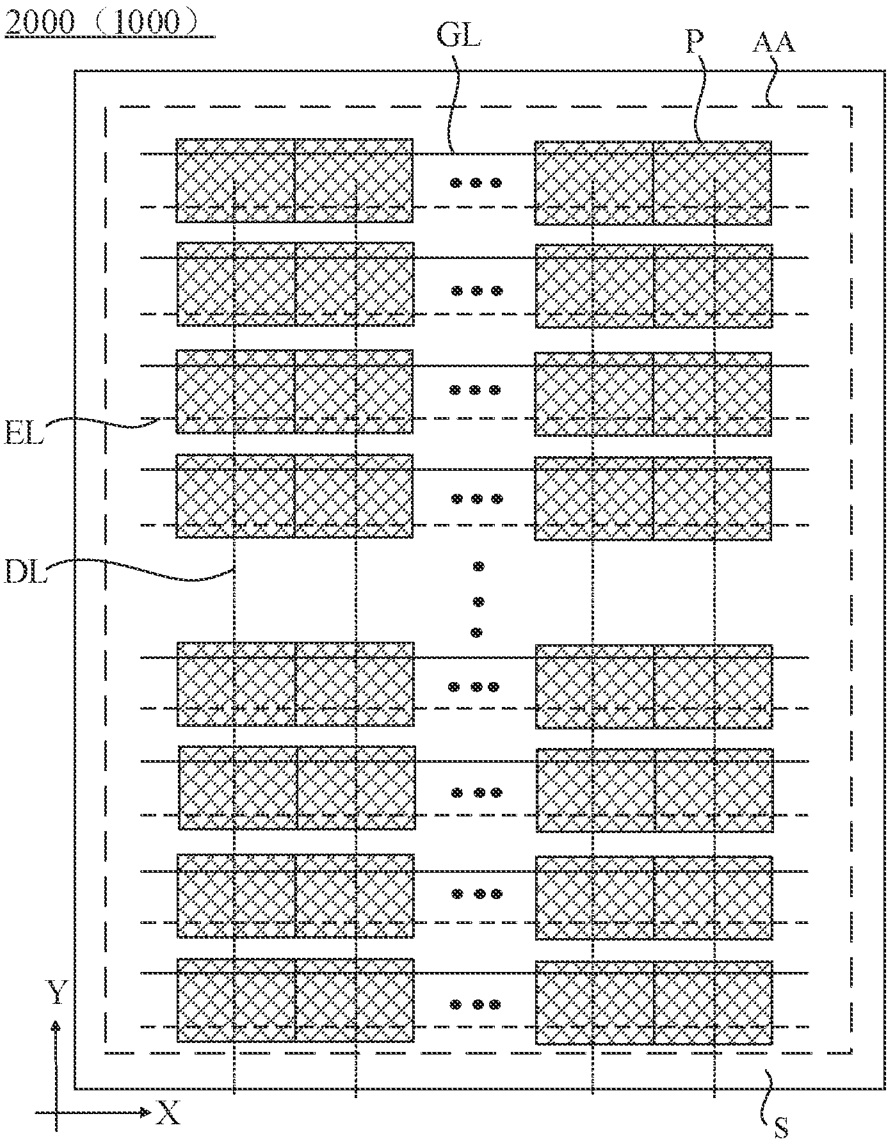
FIG. 4 is a structural diagram of another display apparatus, in accordance with some embodiments of the present disclosure.

In some examples, as shown in FIG. 4, the display apparatus 2000 includes the display substrate 1000. The display substrate 1000 has an active area (AA).

For example, as shown in FIG. 4, the display substrate 1000 may further have a peripheral area S. The peripheral area S is located on at least one side of the active area AA.

In some examples, as shown in FIG. 4, the display substrate 1000 includes a base substrate.

The base substrate may have various structures, which may be selected and set according to actual needs.

For example, the base substrate may be a rigid base substrate. The rigid base substrate may be, for example, a glass base substrate or a polymethyl methacrylate (PMMA) base substrate. In this case, the display substrate 1000 may be a rigid display substrate.

For another example, the base substrate may be a flexible base substrate. The flexible base substrate may be, for example, a polyethylene terephthalate (PET) base substrate, a polyethylene naphthalate two formic acid glycol ester (PEN) base substrate, or a polyimide (PI) base substrate. In this case, the display substrate 1000 may be a flexible display substrate.

In some examples, as shown in FIG. 4, the display substrate 1000 further includes a plurality of sub-pixels P disposed on a side of the base substrate and located in the active area AA.

For example, the plurality of sub-pixels P may be arranged in an array. For example, sub-pixels P arranged in a line in an X direction in FIG. 4 are referred to as sub-pixels in a same row, and sub-pixels P arranged in a line in a Y direction in FIG. 4 are referred to as sub-pixels in a same column.

Herein, the X direction and the Y direction intersect each other. An included angle between the X direction and the Y direction may be selected and set according to actual needs. For example, the included angle between the X direction and the Y direction may be 85°, 89°, 90°, or the like.

In some examples, as shown in FIG. 4, the display substrate 1000 may further include a plurality of gate lines GL and a plurality of enable signal lines EL, which extend in the X direction, and a plurality of date lines DL extending in the Y direction. The plurality of gate lines GL, the plurality of enable signal lines EL and the plurality of data lines DL are disposed on a same side of the base substrate as the plurality of sub-pixels P, and they four are located in the active area AA. The plurality of enable signal lines EL may be disposed in a same layer as, for example, the plurality of gate lines GL.

For example, a data line DL may be electrically connected to a column of sub-pixels P, and provide data signals for the column of sub-pixels. A gate line GL may be electrically connected to a row of sub-pixels P, and provide scanning signals for the row of sub-pixels. An enable signal line EL may be electrically connected to a row of sub-pixels P. and provide enable signals for the row of sub-pixels.

Figure 6:
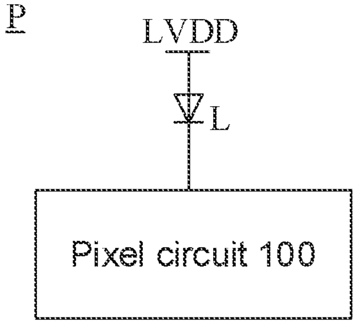
FIG. 6 is a structural diagram of a sub-pixel, in accordance with some embodiments of the present disclosure.

In some examples, as shown in FIG. 6, each sub-pixel P includes a pixel circuit 100 and a light-emitting device L. The pixel circuit 100 is electrically connected to the light-emitting device L, and the pixel circuit 100 is used to provide a driving signal to the light-emitting device L to drive the light-emitting device L to emit light.

For example, as shown in FIG. 6, a first electrode (which may be, for example, an anode) of the light-emitting device L is electrically connected to a third voltage signal terminal LVDD, and a second electrode (which may be, for example, a cathode) of the light-emitting device L is electrically connected to the pixel circuit 100.

For example, the third voltage signal terminal LVDD is configured to transmit a direct current (DC) high level signal (e.g., higher than or equal to a high level portion of a clock signal). Herein, the DC high level signal is referred to as a third voltage signal.

For example, the light-emitting device L includes a current-driven type device. Further, the current-driven type device may be a current-type light-emitting diode, such as a micro light-emitting diode (Micro LED), a mini light-emitting diode (Mini LED), an organic light-emitting diode (OLED), or a quantum dot light-emitting diode (QLED).

It will be noted that, a gray scale displayed by the light-emitting device L during light emission is related to a light-emitting duration and/or a driving current of the light-emitting device L. Therefore, controlling the gray scale presented by the light-emitting device L may be achieved by adjusting the light-emitting duration and/or the driving current of the light-emitting device L. For example, if driving currents of two light-emitting devices L are same, and light-emitting durations thereof are different, gray scales presented by the two light-emitting devices L are different; if driving currents of two light-emitting devices L are different, and light-emitting durations thereof are same, gray scales presented by the two light-emitting devices L are also different; if driving currents and light-emitting durations of two light-emitting devices L are both different, it needs to be analyzed specifically whether gray scales presented by the two light-emitting devices L are same.

Figure 7:
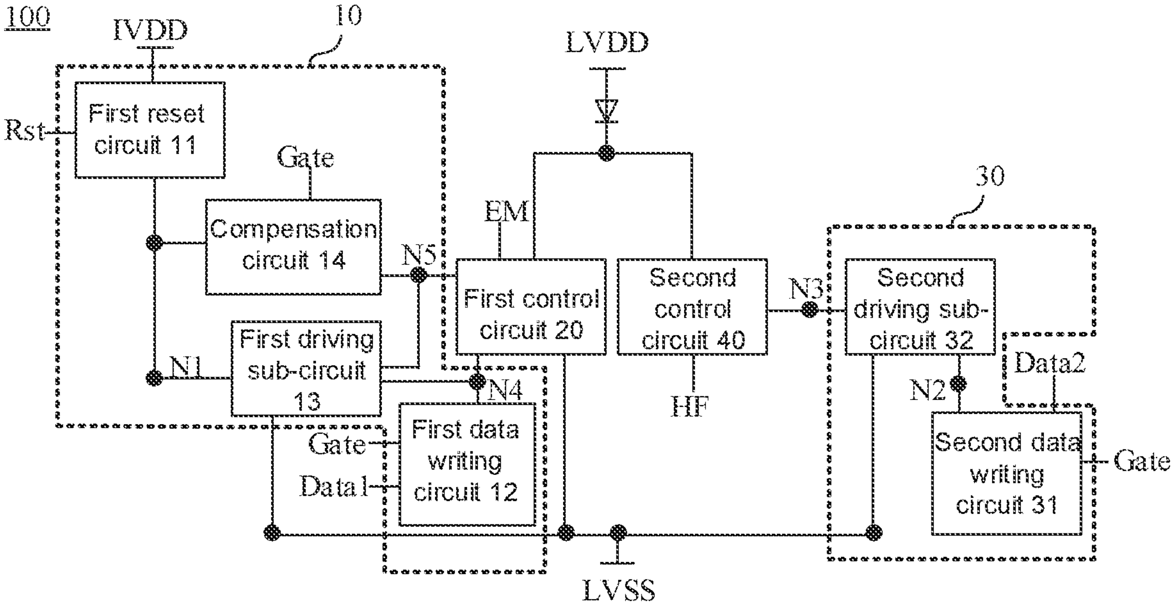
FIG. 7 is a structural diagram of a pixel circuit, in accordance with some embodiments of the present disclosure.

Some embodiments of the present disclosure provide a pixel circuit 100. As shown in FIG. 7, the pixel circuit 100 includes a first driving circuit 10 and a first control circuit 20.

For example, as shown in FIG. 7, the first driving circuit 10 is electrically connected to at least a scanning signal terminal Gate, a first data signal terminal Data1, a first voltage signal terminal LVSS and a first node N1. The first driving circuit 10 is configured to write a first data signal received at the first data signal terminal Data1 into the first node N1 in response to a scanning signal received at the scanning signal terminal Gate.

For example, in a case where the scanning signal is at a high level, the first driving circuit 10 may receive and transmit the first data signal to the first node N1 under control of the scanning signal.

For example, as shown in FIG. 7, the first control circuit 20 is electrically connected to an enable signal terminal EM, the first voltage signal terminal LVSS and the first driving circuit 10. The first control circuit 20 is configured to be further electrically connected to the light-emitting device, and the first control circuit is further configured to transmit a first voltage signal from the first voltage signal terminal to the first driving circuit, and to transmit a first driving signal generated by the first driving circuit according to a voltage of the first node N1 and the first voltage signal transmitted by the first voltage terminal LVSS to the light-emitting device in response to an enable signal received at the enable signal terminal EM.

For example, in a case where the enable signal is at a high level, the first control circuit 20 may be turned on under control of the enable signal, so that a conductive path is formed between the light-emitting device L and the first voltage signal terminal LVSS through the first driving circuit 10 and the first control circuit 20, and in turn, the first driving signal for controlling a light-emitting state (which may be, for example, a light-emitting brightness) of the light-emitting device L, generated by the first driving circuit according to the voltage of the first node N1 and the first voltage signal, is transmitted to the light-emitting device.

For example, the first voltage signal terminal LVSS is configured to transmit a DC low level signal (e.g., lower than or equal to a low level portion of the clock signal). Herein, the DC low level signal is referred to as the first voltage signal.

It will be noted that, the "high level" and the "low level" mentioned herein are only described relatively, and do not define a relationship between magnitudes of a voltage value of the high level signal and 0 V, nor do they define a relationship between magnitudes of a voltage value of the low level signal and 0 V.

For example, in a case where the sub-pixel P where the pixel circuit 100 is located displays medium and high gray scales, in the pixel circuit 100, the first data signal may be written into the first node N1 by the first driving circuit 10, and the first driving signal may be generated by the first driving circuit 10 to control the light-emitting state of the light-emitting device L. The light-emitting brightness of the light-emitting device L corresponds to a gray scale required to be displayed by the corresponding sub-pixel P.

It can be understood that, a magnitude of a voltage value of the first data signal determines a magnitude of a voltage value of the first node N1, and the magnitude of the voltage value of the first node N1 and a magnitude of a voltage value of the first voltage signal determine a magnitude of a current value of the first driving signal transmitted to the light-emitting device L. Since the first voltage signal is a DC low level signal, the current value of the first driving signal may be adjusted by adjusting the voltage value of the first data signal, and in turn, the light-emitting brightness of the light-emitting device L may be adjusted, and the gray scale displayed by the corresponding sub-pixel P may be adjusted.

In a display phase of a frame of the sub-pixel P, a light-emitting period may be included.

In the light-emitting period of the sub-pixel P, the enable signal is substantially maintained at a high level, the first control circuit 20 is always in a turn-on state in response to the enable signal, and the conductive path always exists between the light-emitting device L and the first voltage signal terminal LVSS, so that the first driving signal may be continuously transmitted to the light-emitting device L. By making the voltage value of the first data signal high, the current value of the first driving signal may be made high, and in turn, the light-emitting device L is able to emit light when driven by the first driving signal with the high current value, and it is possible to ensure that the light-emitting device L has a high luminous efficiency.

It can be understood that, the current value of the first driving signal should be in a range, which enables the light-emitting device L to operate in a range where the luminous efficiency is high and stable, uniformity of color coordinates is good, and a dominant wavelength of the emitted light is stable.

In some examples, as shown in FIG. 7, the pixel circuit 100 further includes a second driving circuit 30 and a second control circuit 40.

For example, as shown in FIG. 7, the second driving circuit 30 is electrically connected to at least the scanning signal terminal Gate, a second data signal terminal Data2, a second node N2 and the first voltage signal terminal LVSS. The second driving circuit 30 is configured to write a second data signal received at the second data signal terminal Data2 into the second node N2 in response to the scanning signal.

For example, in the case where the scanning signal is at the high level, the second driving circuit 30 may receive and transmit the second data signal to the second node N2 under the control of the scanning signal.

For example, as shown in FIG. 7, the second control circuit 40 is electrically connected to a control signal terminal HF and the second driving circuit 30. The second control circuit 40 is configured to be further electrically connected to the light-emitting device. The second control circuit 40 is further configured to transmit a second driving signal generated by the second driving circuit according to a voltage of the second node N2 and the first voltage signal from the first voltage signal terminal to the light-emitting device in response to a control signal received at the control signal terminal HF, so as to control the light-emitting brightness and the light-emitting duration of the light-emitting device L.

For example, in a case where the control signal is at a high level, the second control circuit 40 may be turned on under control of the control signal, so that a conductive path is formed between the light-emitting device L and the first voltage signal terminal LVSS through the second driving circuit 30 and the second control circuit 40, and in turn, the second driving signal for controlling the light-emitting state (e.g., including the light-emitting brightness and the light-emitting duration) of the light-emitting device L generated by the second driving circuit 30 according to the voltage of the second node N2 and the first voltage signal is transmitted to the light-emitting device L.

For example, the control signal transmitted by the control signal terminal HF is a pulse signal. For example, in the display phase of a frame, the control signal has a plurality of pulses. For example, a frequency of the control terminal is greater than a frequency of the enable signal. For example, in a unit time, the number of periods during which the enable signal is at an effective level (e.g., a high level) is less than the number of periods during which the control signal is at an effective level (e.g., a high level).

For example, the control signal is a high-frequency pulse signal. For example, the frequency of the control signal is in a range of 3000 Hz and 60000 Hz inclusive. For example, the frequency of the control signal may be 3000 Hz or 60000 Hz.

For example, a frame frequency of the display substrate 1000 is 60 Hz. That is, the display substrate 1000 may display 60 frames images within 1 second, and a display duration of each frame image (i.e., a display phase of each frame) is equal. In this way, in a case where the control signal is a high-frequency signal with a frequency of 3000 Hz, in the display phase of a frame, if the light-emitting device L is to emit a brightness corresponding to a low gray scale, the light-emitting device L may receive approximately 50 effective periods of the high-frequency signal during the light-emitting period.

For example, in a case where the sub-pixel P where the pixel circuit 100 is located displays a low gray scale, in the pixel circuit 100, the second data signal may be written into the second node N2 by the second driving circuit 30, and the second driving signal may be generated by the second driving circuit 30 to control the light-emitting brightness and the light-emitting duration of the light-emitting device L. A combination of the light-emitting brightness and the light-emitting duration of the light-emitting device L enables the sub-pixel P to display a corresponding gray scale.

It can be understood that, a magnitude of a voltage value of the second data signal determines a magnitude of a voltage value of the second node N2, and the magnitude of the voltage value of the second node N2 and the magnitude of the voltage value of the first voltage signal determine a magnitude of a current value of the second driving signal transmitted to the light-emitting device L. Since the first voltage signal is a DC voltage signal, the current value of the second driving signal may be adjusted by adjusting the voltage value of the second data signal, and in turn, the light-emitting brightness of the light-emitting device L may be adjusted.

In addition, the frequency of the control signal determines a turn-on frequency of the second control circuit 40, and determines a frequency at which the conductive path is formed between the light-emitting device L and the first voltage signal terminal LVSS, and in turn determines a frequency at which the second driving signal is transmitted to the light-emitting device L. The frequency at which the second driving signal is transmitted to the light-emitting device L determines a total duration during which the light-emitting device L emits light in the display phase of a frame. The total duration during which the light-emitting device L emits light in the display phase of a frame is a sum of sub-durations during which the light-emitting device L emits light when the conductive path is formed multiple times in the display phase of the frame.

In the light-emitting period of the sub-pixel P, since the control signal is a high-frequency pulse signal, the second control circuit 40 is in a state of being turned on and turned off alternately, so that the second driving signal is intermittently transmitted to the light-emitting device L, and in turn, the light-emitting device L intermittently receives the second driving signal. For example, the light-emitting device L stops receiving the second driving signal for a period of time after receiving the second driving signal for a period of time, and then stops receiving the second driving signal for a period of time after receiving the second driving signal for a period of time. Therefore, a time during which the conductive path is formed between the light-emitting device L and the first voltage signal terminal LVSS is shortened, and a time during which the second driving signal is transmitted to the light-emitting device L is shortened.

As a result, with cooperation of the second driving circuit 30 and the second control circuit 40, the gray scale displayed by the corresponding sub-pixel P is determined by the magnitude of the current value of the second driving signal and the frequency at which the second driving signal is transmitted to the light-emitting device L (i.e., the total duration during which the light-emitting device L emits light) jointly.

Compared with a case where the human eyes obviously perceive the flicker due to that the light-emitting device does not operate for a long period of time after operating for a short period of time, the light-emitting device L in the embodiments of the present disclosure is intermittently in the light-emitting state. That is, the light-emitting device L alternately emits light and does not emit light at a large alternating frequency. Therefore, the human eyes will not easily observe the flicker phenomenon, which facilitates to improve a display effect.

For example, the corresponding sub-pixel P may display the low gray scale by making the current value of the second driving signal to be maintained in a high range or as a large fixed value and changing the light-emitting duration of the light-emitting device L. In this way, it is possible to improve an operating efficiency of the light-emitting device L, to avoid problems of low operating efficiency and high power consumption of the light-emitting device L, and to avoid reduction of uniformity of the displayed gray scale, so as to avoid a phenomenon of color cast of a displayed image, and improve the display effect of the display substrate 1000.

It will be pointed out that, the words "high" and "large" in the above description "making the current value of the second driving signal to be maintained in a high range or as a large fixed value" are described relative to achieving a low gray scale display only by means of a small current value. In a case of displaying the low gray scale, a specific magnitude of the current value of the second driving signal needs to be determined according to actual situations.

It can be seen from the above contents that, the pixel circuit 100 may include two conductive paths, which are a first conductive path composed of the first driving circuit and the first control circuit, and a second conductive path composed of a second driving circuit and a second control circuit. The two conductive paths each separately control the light-emitting state of the light-emitting device L. The first conductive path between the light-emitting device L and the first voltage signal terminal LVSS may be turned on by using the enable signal, so that the corresponding sub-pixel P may be driven to display the medium and high gray scales; the second conductive path between the light-emitting device L and the first voltage signal terminal LVSS may be turned on by using the control signal, so that the corresponding sub-pixel P may be driven to display the low gray scale. That is, switching a turn-on state of the first conductive path and a turn-on state of the second conductive path may be achieved by respectively controlling the enable signal and the control signal. In this way, in a case of the switching between the turn-on state of the first conductive path and the turn-on state of the second conductive path, there is no need to switch a level of the first data signal between a high level and a low level, and there is also no need to switch a level of the second data signal between a high level and a low level, and thus the power consumption of the pixel circuit 100 in the present disclosure is lower compared with the related art.

Therefore, in the pixel circuit 100 provided in the embodiments of the present disclosure, by providing the first driving circuit 10, the first control circuit 20, the second driving circuit 30 and the second control circuit 40, and providing the first driving circuit 10 and the first control circuit 20 between the light-emitting device L and the first voltage signal terminal LVSS to form the first conductive path, and providing the second driving circuit 30 and the second control circuit 40 between the light-emitting device L and the first voltage signal terminal LVSS to form the second conductive path, not only the first driving signal with the high current value, which separately drives the light-emitting device L to emit light continuously in the light-emitting period and controls the light-emitting brightness of the light-emitting device L, may be generated by using the first conductive path in the light-emitting period, so that the sub-pixel P where the pixel circuit 100 is located may display the medium and high gray scales, and the operating efficiency of the light-emitting device L may be ensured, but also the second driving signal, which separately drives the light-emitting device L to emit light intermittently in the light-emitting period and controls the light-emitting brightness of the light-emitting device L during the light emission, may be generated intermittently in the light-emitting period by using the second conductive path, so that the sub-pixel P where the pixel circuit 100 is located may display the low gray scale, and the operating efficiency of the light-emitting device L may be improved.

Moreover, in a case where the level of the enable signal is switched between the high level and a low level, the turn-on state of the first conductive path is also switched, that is, the turn-on state of the first conductive path may be controlled by using the enable signal; in a case where the level of the control signal is switched between the high level and a low level, the turn-on state of the second conductive path is also switched, that is, the turn-on state of the second conductive path may be controlled by using the control signal. In this way, the control over the turn-on state of the first conductive path and the turn-on state of the second conductive path may be achieved by using changes of the levels of the enable signal and the control signal themselves respectively, without switching the level of the first data signal between the high level and the low level, and without switching the level of the second data signal between the high level and the low level. As a result, the power consumption may be effectively reduced compared with the pixel circuit in the related art.

Herein, it will be noted that, in the case where the sub-pixel P where the pixel circuit 100 is located displays the medium and high gray scales, the first conductive path and the second conductive path between the light-emitting device L and the first voltage signal terminal LVSS may be simultaneously turned on. In this way, the first driving signal and the second driving signal may be simultaneously transmitted to the light-emitting device L, accuracy of gradient change of the light-emitting brightness of the light-emitting device L may be improved, and in turn, accuracy of the gray scale displayed by the sub-pixel P may be improved.

In some embodiments, as shown in FIG. 7, the second driving circuit 30 includes a second data writing circuit 31 and a second driving sub-circuit 32.

For example, as shown in FIG. 7, the second data writing circuit 31 is electrically connected to the scanning signal terminal Gate, the second data signal terminal Data2 and the second node N2. The second data writing circuit 31 is configured to write the second data signal into the second node N2 in response to the scanning signal.

For example, in the case where the scanning signal is at the high level, the second data writing circuit 31 may be turned on under the control of the scanning signal, and write the second data signal received at the second data signal terminal Data2 into the second node N2.

For example, as shown in FIG. 7, the second driving sub-circuit 32 is electrically connected to the second node N2, a third node N3 and the first voltage signal terminal LVSS. The second driving sub-circuit 32 is configured to generate the second driving signal according to the voltage of the second node and the first voltage signal from the first voltage signal terminal, and to transmit the second driving signal to the third node under control of the voltage of the second node N2.

For example, in a case where the voltage of the second node N2 is a high voltage, the second driving sub-circuit 32 may be turned on under the control of the voltage of the second node N2, and generate the second driving signal according to the voltage of the second node and the first voltage signal from the first voltage signal terminal, and transmit the second driving signal to the third node N3.

Hereinafter, structures of the second data writing circuit 31, the second driving sub-circuit 32 and the second control circuit 40 will be schematically described.

Figure 8:
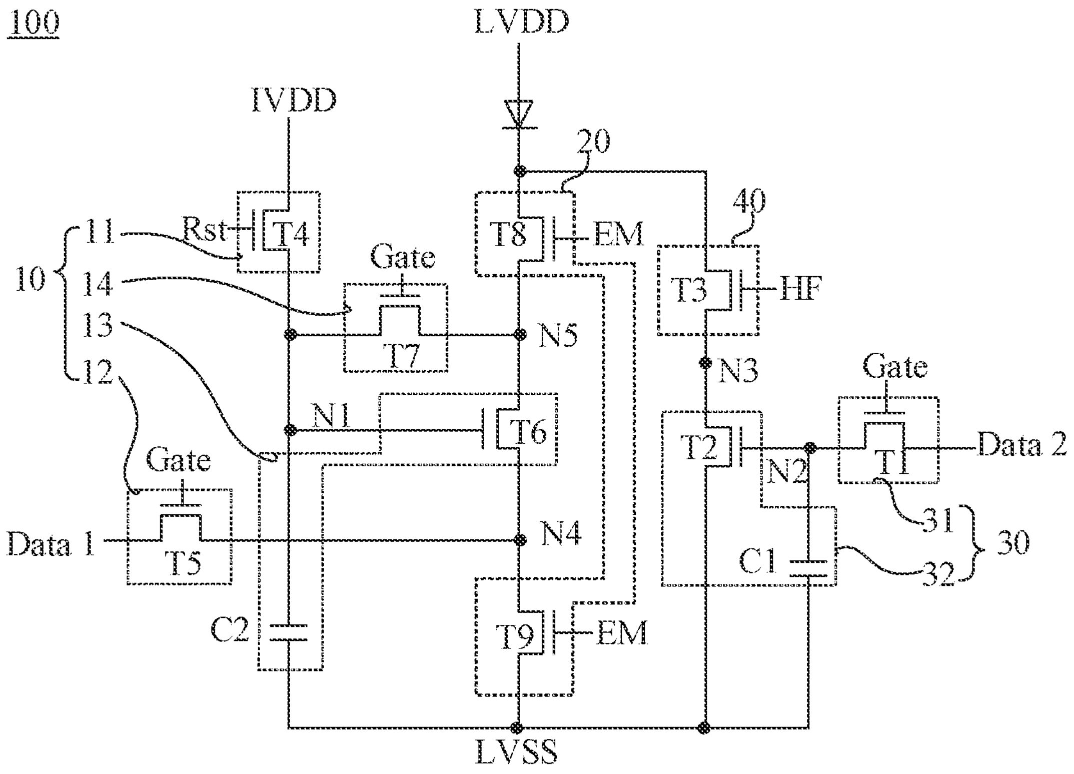
FIG. 8 is a circuit diagram of a pixel circuit, in accordance with some embodiments of the present disclosure.

In some examples, as shown in FIG. 8, the second data writing circuit 31 includes a first transistor T1.

For example, as shown in FIG. 8, a control electrode of the first transistor T1 is electrically connected to the scanning signal terminal Gate, a first electrode of the first transistor T1 is electrically connected to the second data signal terminal Data2, and a second electrode of the first transistor T1 is electrically connected to the second node N2.

For example, in the case where the scanning signal is at the high level, the first transistor T1 may be turned on under the control of the scanning signal, receive the second data signal, and transmit the second data signal to the second node N2 to charge the second node N2.

In some examples, as shown in FIG. 8, the second driving sub-circuit 32 includes a second transistor T2 and a first capacitor C1.

For example, as shown in FIG. 8, a control electrode of the second transistor T2 is electrically connected to the second node N2, a first electrode of the second transistor T2 is electrically connected to the first voltage signal terminal LVSS, and a second electrode of the second transistor T2 is electrically connected to the third node N3. A first electrode of the first capacitor C1 is electrically connected to the second node N2, and a second electrode of the first capacitor C1 is electrically connected to the first voltage signal terminal LVSS.

For example, in the case where the voltage of the second node N2 is the high voltage, the second transistor may be turned on under the control of the voltage of the second node N2, generate the second driving signal according to the voltage of the second node N2 and the first voltage signal from the first voltage signal terminal LVSS, and transmit the first voltage signal to the third node N3.

It can be understood that, during a process in which the first transistor T1 in the second data writing circuit 31 transmits the second data signal to the second node N2, the first capacitor C1 is charged. In a case where the first transistor T1 is turned off, the first capacitor C1 may discharge to maintain the voltage value of the second node N2 as the voltage value of the second data signal, so that the second transistor T2 is maintained in a turn-on state.

In some examples, as shown in FIG. 8, the second control circuit 40 includes a third transistor T3.

For example, as shown in FIG. 8, a control electrode of the third transistor T3 is electrically connected to the control signal terminal HF, a first electrode of the third transistor T3 is electrically connected to the third node N3, and a second electrode of the third transistor T3 is configured to be electrically connected to the light-emitting device L.

For example, in the case where the control signal is at the high level, the third transistor T3 may be turned on under the control of the control signal, and transmit the second driving signal generated by the second driving sub-circuit 32 according to the voltage of the second node N2 and the first voltage signal to the light-emitting device L to drive the light-emitting device L to emit light.

In a case where the control signal is at a low level, the third transistor T3 may be turned off under the control of the control signal, and stop transmitting the second driving signal to the light-emitting device L, so that the light-emitting device L does not emit light.

Since the control signal is a high-frequency signal, the third transistor T3 may be alternately turned on and turned off at a high frequency under the control of the control signal, and in turn, in the display phase of a frame, the second driving signal may be transmitted to the light-emitting device L intermittently, so that the light-emitting device L emits light intermittently.

It will be noted that, in a case where the third transistor T3 is turned off under the control of the control signal, the third node N3 is in a floating state. In this case, the second transistor T2 in the second driving circuit 30 may transmit the first voltage signal to the third node N3 under the control of the voltage of the second node N2.

In some embodiments, as shown in FIG. 7, the first driving circuit 10 includes a first reset circuit 11, a first data writing circuit 12, a first driving sub-circuit 13 and a compensation circuit 14.

For example, as shown in FIG. 7, the first reset circuit 11 is electrically connected to a reset signal terminal Rst, the first node N1 and a second voltage signal terminal IVDD. The first reset circuit 11 is configured to transmit a second voltage signal received at the second voltage signal terminal IVDD to the first node N1 in response to a reset signal received at the reset signal terminal Rst.

For example, in a case where the reset signal is at a high level, the first reset circuit 11 may be turned on under control of the reset signal, receive the second voltage signal, and transmit the second voltage signal to the first node N1 to reset the first node N1.

For example, the second voltage signal terminal IVDD is configured to transmit a DC high level signal (e.g., higher than or equal to the high level portion of the clock signal). Here, the DC high level signal is referred to as the second voltage signal.

For example, as shown in FIG. 7, the first data writing circuit 12 is electrically connected to the scanning signal terminal Gate, the first data signal terminal Data1 and a fourth node N4. The first data writing circuit 12 is configured to write the first data signal into the fourth node N4 in response to the scanning signal.

For example, in the case where the scanning signal is at the high level, the first data writing circuit 12 may be turned on under the control of the scanning signal, and write the first data signal received at the first data signal terminal Data1 into the fourth node N4.

For example, as shown in FIG. 7, the first driving sub-circuit 13 is electrically connected to the fourth node N4, a fifth node N5, the first node N1 and the first voltage signal terminal LVSS.

For example, in a case where the voltage of the first node N1 is a high voltage, the first driving sub-circuit 13 may be turned on under the control of the voltage of the first node N1, and transmit the first data signal received at the fourth node N4 to the fifth node N5.

For example, as shown in FIG. 7, the compensation circuit 14 is electrically connected to the scanning signal terminal Gate, the fifth node N5 and the first node N1. The compensation circuit 14 is configured to electrically connect the fifth node N5 to the first node N1 in response to the scanning signal.

For example, in the case where the scanning signal is at the high level, the compensation circuit 14 may be turned on under the control of the scanning signal, and electrically connect the fifth node N5 to the first node N1 to compensate a threshold voltage of the first driving sub-circuit 13.

Based on this, the first driving sub-circuit 13 is configured to transmit the first data signal received at the fourth node N4 to the first node N1 when the fifth node N5 is electrically connected to the first node N1, and store the voltage of the first node N1; and the first driving sub-circuit 13 is further configured to generate the first driving signal according to the voltage of the first node N1 and the first voltage signal transmitted to the fourth node N4.

Hereinafter, structures of the first reset circuit 11, the first data writing circuit 12, the first driving sub-circuit 13 and the compensation circuit 14 will be schematically described.

In some examples, as shown in FIG. 8, the first reset circuit 11 includes a fourth transistor T4.

For example, as shown in FIG. 8, a control electrode of the fourth transistor T4 is electrically connected to the reset signal terminal Rst, a first electrode of the fourth transistor T4 is electrically connected to the second voltage signal terminal IVDD, and a second electrode of the fourth transistor T4 is electrically connected to the first node N1.

For example, in the case where the reset signal is at the high level, the fourth transistor T4 may be turned on under the control of the reset signal, receive the second voltage signal, and transmit the second voltage signal to the first node N1 to reset the first node N1.

In some examples, as shown in FIG. 8, the first data writing circuit 12 includes a fifth transistor T5.

For example, as shown in FIG. 8, a control electrode of the fifth transistor T5 is electrically connected to the scanning signal terminal Gate, a first electrode of the fifth transistor T5 is electrically connected to the first data signal terminal Data1, and a second electrode of the fifth transistor T5 is electrically connected to the fourth node N4.

For example, in the case where the scanning signal is at the high level, the fifth transistor T5 may be turned on under the control of the scanning signal, receive the first data signal, and transmit the first data signal to the fourth node N4.

In some examples, as shown in FIG. 8, the first driving sub-circuit 13 includes a sixth transistor T6 and a second capacitor C2.

For example, as shown in FIG. 8, a control electrode of the sixth transistor T6 is electrically connected to the first node N1, a first electrode of the sixth transistor T6 is electrically connected to the fourth node N4, and a second electrode of the sixth transistor T6 is electrically connected to the fifth node N5. A first electrode of the second capacitor C2 is electrically connected to the first node N1, and a second electrode of the second capacitor C2 is electrically connected to the first voltage signal terminal LVSS.

For example, in the case where the voltage of the first node N1 is the high voltage, the sixth transistor T6 may be turned on under the control of the voltage of the first node N1, receive a voltage signal at the fourth node N4, and transmit the voltage signal at the fourth node N4 to the fifth node N5.

Since the second voltage signal is the DC high level signal, after the fourth transistor T4 transmits the second voltage signal to the first node N1, the voltage of the first node N1 may be raised, so that the sixth transistor T6 is turned on.

It can be understood that, during a process in which the fourth transistor T4 resets the first node N1, the second capacitor C2 is charged. In a case where the fourth transistor T4 is turned off, the second capacitor C2 may discharge, so that the voltage of the first node N1 is maintained at the high voltage, and in turn, the sixth transistor T6 may be maintained in a turn-on state.

In some examples, as shown in FIG. 8, the compensation circuit 14 includes a seventh transistor T7.

For example, as shown in FIG. 8, a control electrode of the seventh transistor T7 is electrically connected to the scanning signal terminal Gate, a first electrode of the seventh transistor T7 is electrically connected to the fifth node N5, and a second electrode of the seventh transistor T7 is electrically connected to the first node N1.

For example, in the case where the scanning signal is at the high level, the seventh transistor T7 may be turned on under the control of the scanning signal, electrically connect the fifth node N5 to the first node N1.

It can be understood that, since the control electrode of the fifth transistor T5 and the control electrode of the seventh transistor T7 are both electrically connected to the scanning signal terminal Gate, the fifth transistor T5 and the seventh transistor T7 may be simultaneously turned on under the control of the scanning signal. As a result, the first data signal may be transmitted to the first node N1 through the fifth transistor T5, the fourth node N4, the sixth transistor T6, the fifth node N5 and the seventh transistor T7 in sequence, so as to compensate a threshold voltage of the sixth transistor T6.

In some examples, as shown in FIG. 8, the first control circuit 20 includes an eighth transistor T8 and a ninth transistor T9.

For example, as shown in FIG. 8, a control electrode of the eighth transistor T8 is electrically connected to the enable signal terminal EM, a first electrode of the eighth transistor T8 is electrically connected to the fifth node N5, and a second electrode of the eighth transistor T8 is configured to be electrically connected to the light-emitting device L.

For example, as shown in FIG. 8, a control electrode of the ninth transistor T9 is electrically connected to the enable signal terminal EM, a first electrode of the ninth transistor T9 is electrically connected to the first voltage signal terminal LVSS, and a second electrode of the ninth transistor T9 is electrically connected to the fourth node N4.

For example, in the case where the enable signal is at the high level, the eighth transistor T8 and the ninth transistor T9 may be simultaneously turned on under the control of the enable signal, so that the conductive path is formed between the light-emitting device L and the first voltage signal terminal LVSS, and in turn, the first driving signal generated by the sixth transistor T6 according to the voltage of the first node N1 and the first voltage signal is transmitted to the light-emitting device L to drive the light-emitting device L to emit light.

Herein, it will be noted that the first driving circuit 10 may also have other structures.

Figure 11:
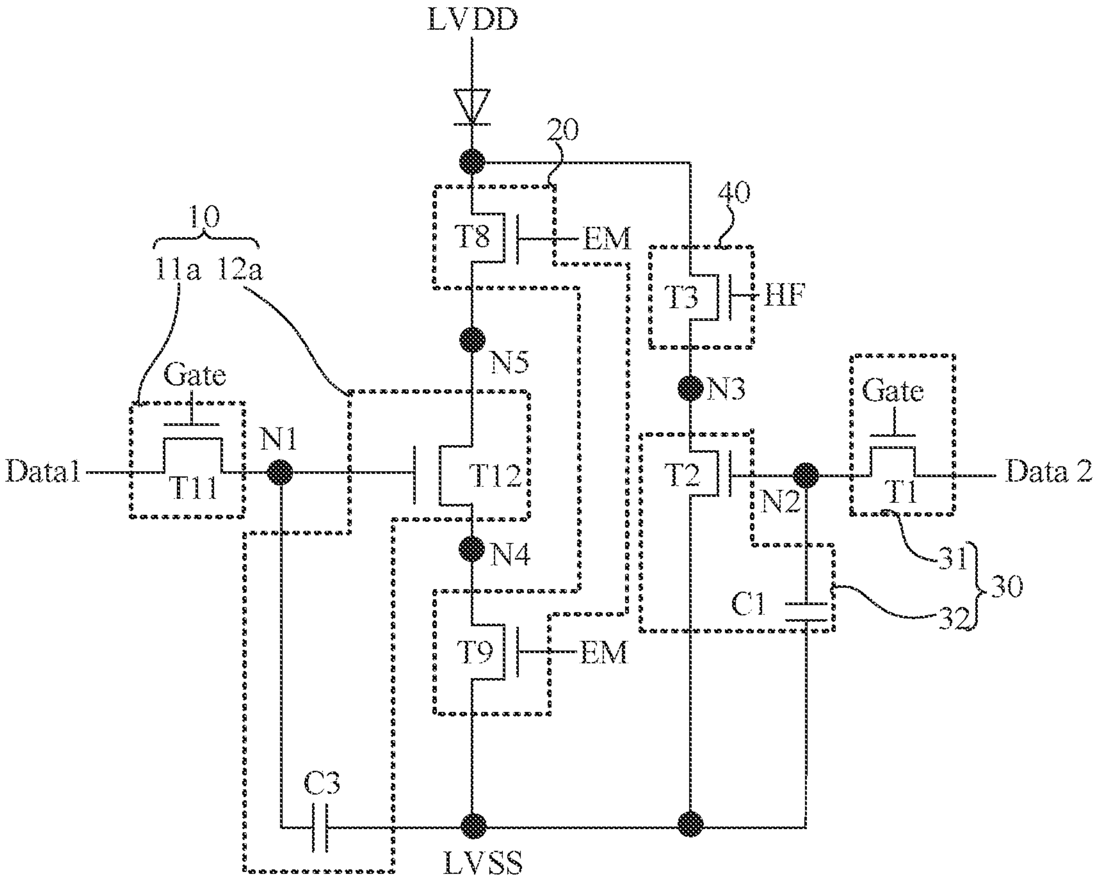
FIG. 11 is a circuit diagram of yet another pixel circuit, in accordance with some embodiments of the present disclosure.

In some embodiments, as shown in FIG. 11, the first driving circuit 10 may include a third data writing circuit 11*a* and a third driving sub-circuit 12*a*.

For example, as shown in FIG. 11, the third data writing circuit 11*a* is electrically connected to the scanning signal terminal Gate, the first data signal terminal Data1 and the first node N1. The third data writing circuit 11*a* is configured to write the first data signal into the first node N1 in response to the scanning signal.

For example, in the case where the scanning signal is at the high level, the third data writing circuit 11*a* may be turned on under the control of the scanning signal, receive the first data signal, and transmit the first data signal to the first node N1 to charge the first node.

For example, as shown in FIG. 11, the third driving sub-circuit 12*a* is electrically connected to the fourth node N4, the fifth node N5, the first node N1 and the first voltage signal terminal LVSS. The first driving sub-circuit 12*a* is configured to transmit the first voltage signal to the fifth node N5 under the control of the voltage of the first node N1.

For example, in the case where the voltage of the first node N1 is the high voltage, the third driving sub-circuit 12*a* may be turned on under the control of the voltage of the first node N1, and receive and transmit the first voltage signal to the fifth node N5.

Hereinafter, structures of the third data writing circuit 11*a* and the third driving sub-circuit 12*a* will be schematically described.

In some examples, as shown in FIG. 11, the third data writing circuit 11*a* includes an eleventh transistor T11.

For example, as shown in FIG. 11, a control electrode of the eleventh transistor T11 is electrically connected to the scanning signal terminal Gate, a first electrode of the eleventh transistor T11 is electrically connected to the first data signal terminal Data1, and a second electrode of the eleventh transistor T11 is electrically connected to the first node N1.

For example, in the case where the scanning signal is at the high level, the eleventh transistor T11 may be turned on under the control of the scanning signal, receive the first data signal, and transmit the first data signal to the first node N1.

In some examples, as shown in FIG. 11, the third driving sub-circuit 12*a* includes a twelfth transistor T12 and a third capacitor C3.

For example, as shown in FIG. 11, a control electrode of the twelfth transistor T12 is electrically connected to the first node N1, a first electrode of the twelfth transistor T12 is electrically connected to the fourth node N4, and a second electrode of the twelfth transistor T12 is electrically connected to the fifth node N5. A first electrode of the third capacitor C3 is electrically connected to the first node N1, and a second electrode of the third capacitor C3 is electrically connected to the first voltage signal terminal LVSS.

For example, in the case where the voltage of the first node N1 is the high voltage, the twelfth transistor T12 may be turned on under the control of the voltage of the first node N1, and receive and transmit the first voltage signal to the fifth node N5.

It can be understood that, during a process in which the eleventh transistor T11 charges the first node N1, the third capacitor C3 is also charged. In a case where the eleventh transistor T11 is turned off, the third capacitor C3 may discharge, so that the voltage of the first node N1 is maintained the high voltage, and in turn, the twelfth transistor T12 may be maintained in a turn-on state.

Figure 12:
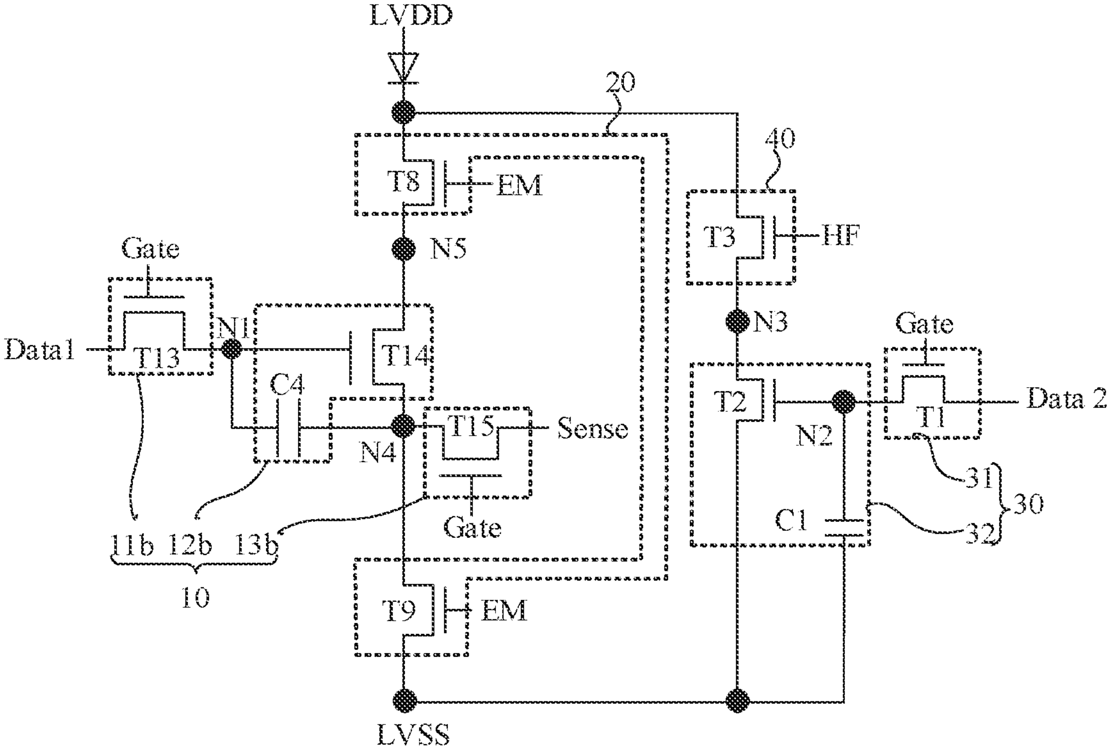
FIG. 12 is a circuit diagram of yet another pixel circuit, in accordance with some embodiments of the present disclosure.

In some other embodiments, as shown in FIG. 12, the first driving circuit 10 may include a fourth data writing circuit 11*b*, a fourth driving sub-circuit 12*b* and a sensing circuit 13*b*.

For example, as shown in FIG. 12, the fourth data writing circuit 11*b* is electrically connected to the scanning signal terminal Gate, the first data signal terminal Data1 and the first node N1. The fourth data writing circuit 11*b* is configured to write the first data signal into the first node N1 in response to the scanning signal.

For example, in the case where the scanning signal is at the high level, the fourth data writing circuit 11*b* may be turned on under the control of the scanning signal, receive the first data signal, and transmit the first data signal to the first node N1 to charge the first node.

For example, as shown in FIG. 12, the fourth driving sub-circuit 12*b* is electrically connected to the fourth node N4, the fifth node N5 and the first node N1. The fourth driving sub-circuit 12*b* is configured to transmit the first voltage signal under the control of the voltage of the first node N1 to the fifth node N5.

For example, in the case where the voltage of the first node N1 is the high voltage, the fourth driving sub-circuit 12*b* may be turned on under the control of the voltage of the first node N1, and receive and transmit the first voltage signal to the fifth node N5.

For example, as shown in FIG. 12, the sensing circuit 13*b* is electrically connected to the scanning signal terminal Gate, the fourth node N4 and a sensing signal terminal Sense. The sensing circuit 13*b* is configured to detect electrical characteristic(s) of the fourth driving sub-circuit 12*b* in response to the scanning signal, so as to achieve external compensation.

For example, in the case where the scanning signal is at the high level, the sensing circuit 13*b* may be turned on under the control of the scanning signal, and detect the electrical characteristic(s) of the fourth driving sub-circuit 12*b* to achieve the external compensation.

Hereinafter, structures of the fourth data writing circuit 11*b*, the fourth driving sub-circuit 12*b* and the sensing circuit 13*b* will be schematically described.

In some examples, as shown in FIG. 12, the fourth data writing circuit 11*b* includes a thirteenth transistor T13.

For example, as shown in FIG. 12, a control electrode of the thirteenth transistor T13 is electrically connected to the scanning signal terminal Gate, a first electrode of the thirteenth transistor T13 is electrically connected to the first data signal terminal Data1, and a second electrode of the thirteenth transistor T13 is electrically connected to the first node N1.

For example, in the case where the scanning signal is at the high level, the thirteenth transistor T13 may be turned on under the control of the scanning signal, receive the first data signal, and transmit the first data signal to the first node N1.

In some examples, as shown in FIG. 12, the fourth driving sub-circuit 12*b* includes a fourteenth transistor T14 and a fourth capacitor C4.

For example, as shown in FIG. 12, a control electrode of the fourteenth transistor T14 is electrically connected to the first node N1, a first electrode of the fourteenth transistor T14 is electrically connected to the fourth node N4, and a second electrode of the fourteenth transistor T14 is electrically connected to the fifth node N5. A first electrode of the fourth capacitor C4 is electrically connected to the first node N1, and a second electrode of the fourth capacitor C4 is electrically connected to the fourth node N4.

For example, in the case where the voltage of the first node N1 is the high voltage, the fourteenth transistor T14 may be turned on under the control of the voltage of the first node N1, and receive and transmit the first voltage signal to the fifth node N5.

It can be understood that, during a process in which the thirteenth transistor T13 charges the first node N1, the fourth capacitor C4 is also charged. In a case where the thirteenth transistor T13 is turned off, the fourth capacitor C4 may discharge, so that the voltage of the first node N1 is maintained at the high level, and in turn, the fourteenth transistor T14 may be maintained in a turn-on state.

In some examples, as shown in FIG. 12, the sensing circuit 13*b* includes a fifteenth transistor T15.

For example, as shown in FIG. 12, a control electrode of the fifteenth transistor T15 is electrically connected to the scanning signal terminal Gate, a first electrode of the fifteenth transistor T15 is electrically connected to the sensing signal terminal Sense, and a second electrode of the fifteenth transistor T15 is electrically connected to the fourth node N4.

For example, in a sensing period in the display phase, in the case where the scanning signal is at the high level, the fifteenth transistor T15 may be turned on under the control of the scanning signal, and detect electrical characteristic(s) of the fourteenth transistor T14 to achieve the external compensation. The electrical characteristic(s) include, for example, a threshold voltage and/or a carrier mobility of the fourteenth transistor T14.

Here, the sensing signal terminal Sense may provide a reset signal or an acquisition sensing signal. The reset signal is used to reset the fourth node N4, and the acquisition sensing signal is used to acquire the threshold voltage of the fourteenth transistor T14.

Figure 9:
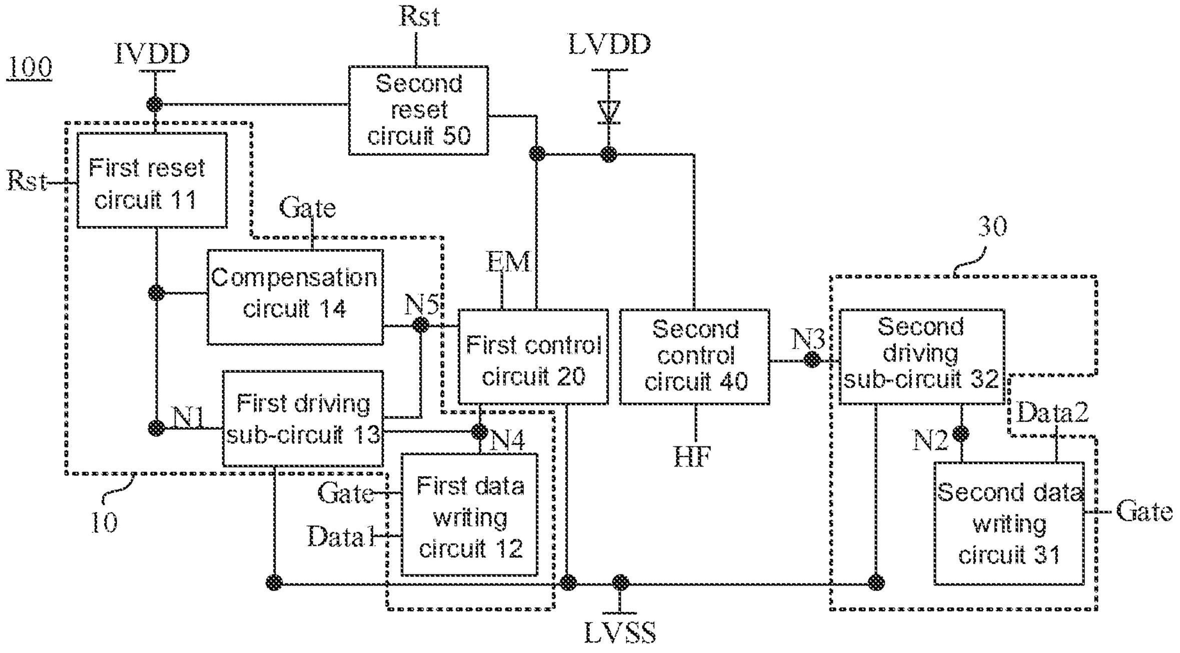
FIG. 9 is a structural diagram of another pixel circuit, in accordance with some embodiments of the present disclosure.

In some embodiments, as shown in FIG. 9, the pixel circuit 100 further includes a second reset circuit 50.

For example, as shown in FIG. 9, the second reset circuit 50 is electrically connected to the reset signal terminal Rst, the second voltage signal terminal IVDD and the light-emitting device L. The second reset circuit 50 is configured to transmit the second voltage signal received at the second voltage signal terminal IVDD to the light-emitting device L in response to the reset signal.

For example, in the case where the reset signal is at the high level, the second reset circuit 50 may be turned on under the control of the reset signal, receive the second voltage signal, and transmit the second voltage signal to the light-emitting device L to reset the light-emitting device L.

In this way, before the light-emitting device L emits light, a residual signal in a display phase of a previous frame may be eliminated, and the residual signal may be prevented from interfering with display of the current frame.

It will be noted that, a voltage value of the second voltage signal is greater than a voltage value of the third voltage signal. For example, the voltage value of the second voltage signal is 15 V, and the voltage value of the third voltage signal is 12 V.

In this way, after the second reset circuit 50 transmits the second voltage signal to the light-emitting device L, the light-emitting device L may be in a reverse biased state, and a situation of erroneous light emission may be avoided.

Figure 10:
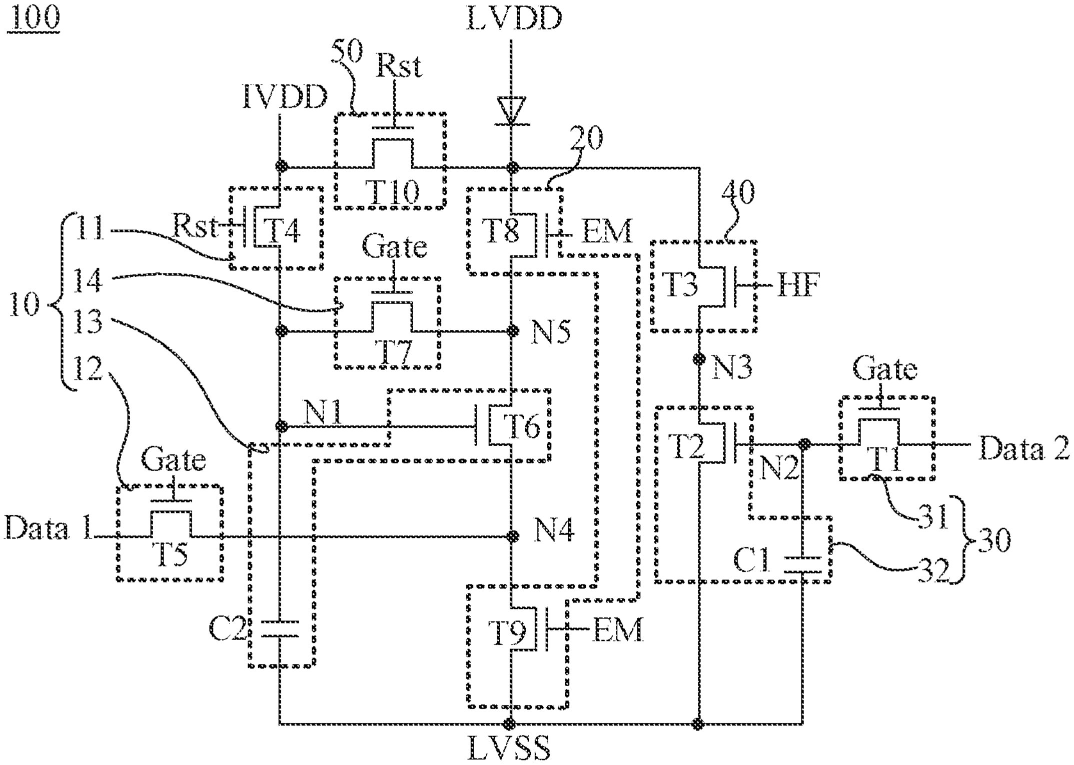
FIG. 10 is a circuit diagram of another pixel circuit, in accordance with some embodiments of the present disclosure.

In some examples, as shown in FIG. 10, the second reset circuit 50 includes a tenth transistor T10.

For example, as shown in FIG. 10, a control electrode of the tenth transistor T10 is electrically connected to the reset signal terminal Rst, a first electrode of the tenth transistor T10 is electrically connected to the second voltage signal terminal IVDD, and a second electrode of the tenth transistor T10 is configured to electrically connect to the light-emitting device L.

For example, in the case where the reset signal is at the high level, the tenth transistor T10 may be turned on under the control of the reset signal, receive the second voltage signal, and transmit the second voltage signal to the light-emitting device L to reset the light-emitting device L.

As can be seen from the above, the pixel circuit 100 in the embodiments of the present disclosure may have a 10T2C structure. Compared with the pixel circuit with the 12T3C structure in the related art, the pixel circuit 100 in the embodiments of the present disclosure requires fewer components (i.e., the transistors and the capacitors), and the circuit structure is simpler, so that costs of the pixel circuit 100 may be effectively reduced, a yield of the pixel circuit 100 may be improved, and it is possible to facilitate to reduce an area occupied by the pixel circuit 100 in the display substrate 1000, and to improve pixels per inch (PPI) of the display substrate 1000.

It will be noted that, an arrangement of the plurality of transistors included in the pixel circuit 100 is not limited in the present disclosure.

In some examples, the plurality of transistors included in the pixel circuit 100 are of a same type. In this way, it is possible to facilitate to simplify a manufacturing process of the pixel circuit 100, and to improve efficiency of manufacturing the pixel circuit 100.

For example, the plurality of transistors included in the pixel circuit 100 may all be oxide transistors or low temperature poly-silicon transistors.

For example, in a case where the plurality of transistors are all the oxide transistors, a material of an active layer of the transistors includes a metal oxide semiconductor material, which includes at least two of indium (In), gallium (Ga), tin (Sn), aluminum (Al), zinc (Zn), a rare earth element, a lanthanide metal and other materials. In terms of a degree of crystallization, the material of the active layer of the transistors may be at least one of an amorphous structure, a crystalline structure, or a nanocrystalline structure between the amorphous structure and the crystalline structure.

In some embodiments, a range of the voltage value of the first data signal transmitted by the first data signal terminal Data1 is same as a range of the voltage value of the second data signal transmitted by the second data signal terminal Data2.

It will be noted that, in the pixel circuit in the related art, a turn-on voltage and a turn-off voltage of the second transistor M2 is in a range of a turn-on voltage of a gate driver chip (VGH, which may be, for example, 21 V) to a turn-off voltage of the gate driver chip (VGL, which may be, for example, −6 V), inclusive; and a turn-on voltage and a turn-off voltage of the fourth transistor M4 is also in the range of VGH to VGL, inclusive. Therefore, a voltage value of the data signal controlling the second transistor M2 and the fourth transistor M4 to be turned on and off is in the range of VGH to VGL, inclusive. The range of VGH to VGL is within a range of a usage voltage of the gate driver chip, and a range of a usage voltage of a source driver chip is smaller than the range of the usage voltage of the gate driver chip. Therefore, it is difficult for the pixel circuit in the related art to support the source driver chip.

The second transistor T2 in the pixel circuit 100 in the embodiments of the present disclosure is a driving transistor. The control electrode of the second transistor T2 is controlled by the second data signal transmitted to the second node N2. In this case, a voltage required for a turn-on voltage and a turn-off voltage of the driving transistor is in a range of a turn-on voltage of a source driver chip (VDH, which may be, for example, 5 V) to a turn-off voltage of the source driver chip (VDL, which may be, for example, 0 V), inclusive. Therefore, the voltage value of the second data signal may be in the range of VDH to VDL, inclusive. That is, the range of the voltage value of the second data signal is applicable to the range of the turn-on voltage and the turn-off voltage of the source driver chip 200, and thus the pixel circuit 100 in the embodiments of the present disclosure may support the source driver chip.

It will be noted that, the first data signal terminal Data1 and the second data signal terminal Data2 may be arranged in various manners, which may be selected and set according to actual needs.

In some examples, the first data signal and the second data signal may be from a same driver chip.

Figure 5:
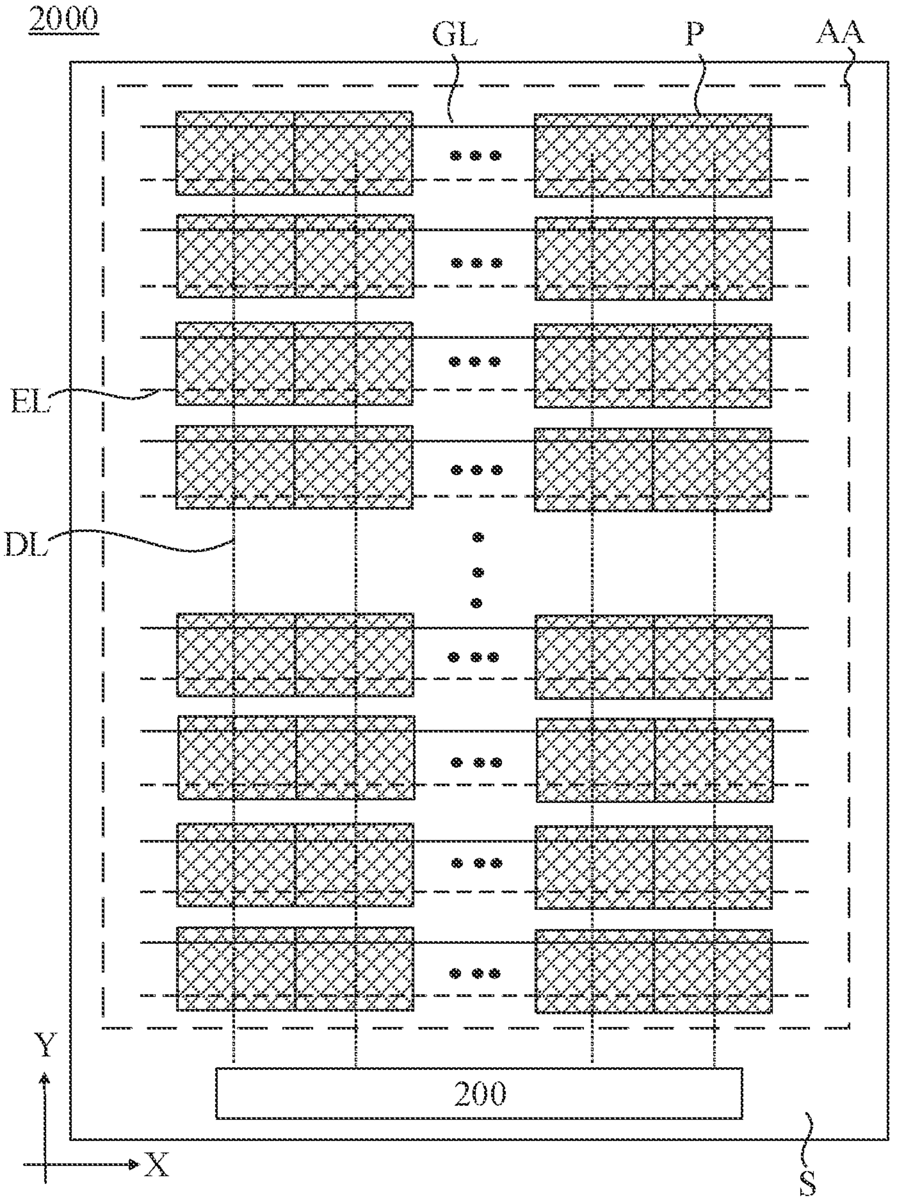
FIG. 5 is a structural diagram of yet another display apparatus, in accordance with some embodiments of the present disclosure.

Based on this, as shown in FIG. 5, the display apparatus 2000 in the embodiments of the present disclosure may further include a source driver chip 200.

For example, in a case where the first data signal terminal Data1 and the second data signal terminal Data2 in the display substrate 1000 are a same signal terminal, the source driver chip 200 is electrically connected to the first data signal terminal Data1 and the second data signal terminal Data2. A corresponding signal may be transmitted simultaneously to the first data signal terminal Data1 and the second data signal terminal Data2 through the source driver chip 200.

Based on this, the number of driver chips provided in the display apparatus 2000 may be reduced, and a structure of the display apparatus 2000 may be simplified.

In some other examples, the first data signal and the second data signal may be from different driver chips.

Based on this, the display apparatus 2000 in the embodiments of the present disclosure may further include a first source driver sub-chip and a second source driver sub-chip. The first source driver sub-chip may be electrically connected to the first data signal terminal Data1, and provide the first data signal for the first data signal terminal Data1. The second source driver sub-chip may be electrically connected to the second data signal terminal Data2, and provide the second data signal for the second data signal terminal Data2.

In this way, it is possible to facilitate to improve accuracy of the first data signal transmitted by the first data signal terminal Data1 and the second data signal transmitted by the second data signal terminal Data2.

In the pixel circuit provided by the embodiments of the present disclosure, specific implementations of the circuits are not limited to the manners described above, and may be any used implementation manners, and may be, for example, conventional connection manners well known to a person skilled in the art, as long as corresponding functions may be achieved. The above examples cannot limit the protection scope of the present disclosure. In practical applications, a person skilled in the art may choose to use or not to use one or more of the circuits and the sub-circuits described above according to situations. None of various combinations and modifications based on the circuits and the sub-circuits described above depart from the principle of the present disclosure, and details will not repeated herein.

Figure 13:
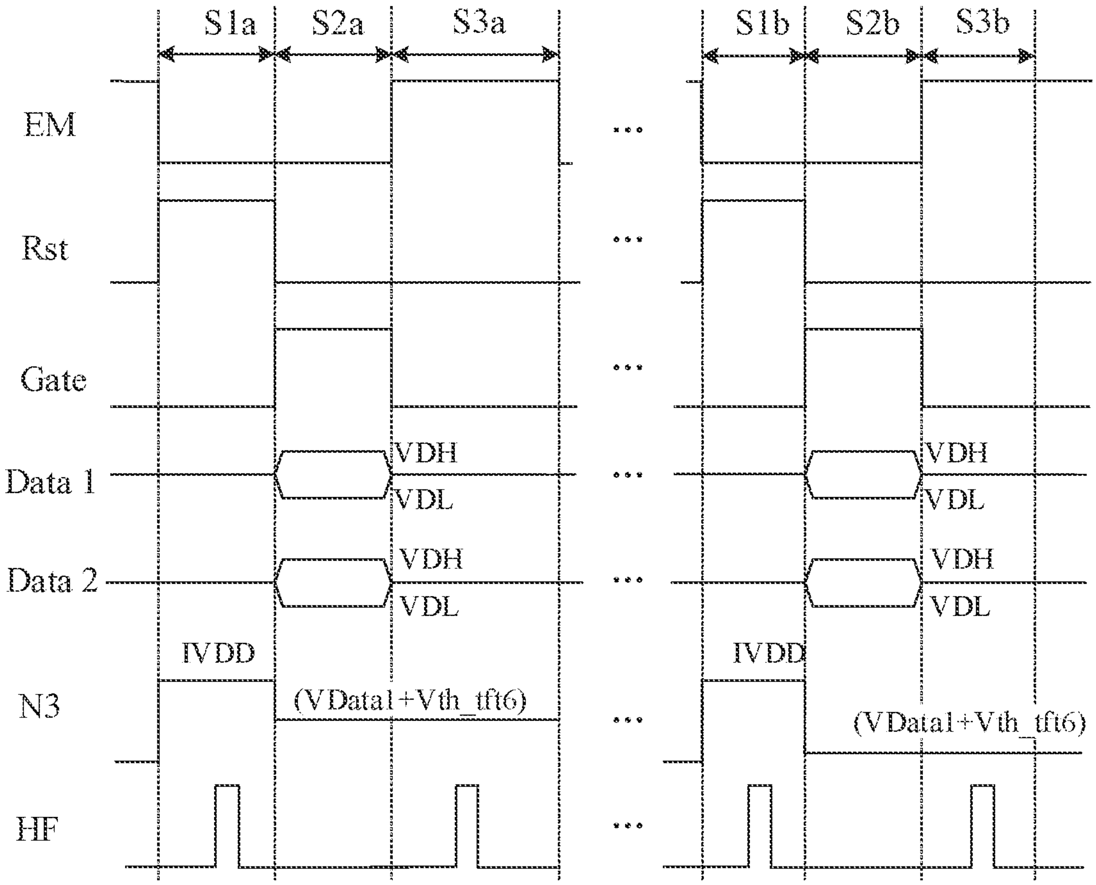
FIG. 13 is an operation timing diagram of a pixel circuit, in accordance with some embodiments of the present disclosure.

Hereinafter, a method for driving the pixel circuit 100 will be schematically described in conjunction with the circuit diagram of the pixel circuit in FIG. 10 and the timing diagram in FIG. 13.

A person skilled in the art may understand that, in a case where the transistors are all P-type transistors, the timing diagram of the signals transmitted by the terminals may be different (e.g., the levels of the signals being inverted), and thus the timing diagram in the present disclosure is not limited thereto. It will be pointed out that, in the case where the transistors are all the P-type transistors, the electrodes of the light-emitting device L may also be inverted, that is, the first electrode of the light-emitting device L is electrically connected to the pixel circuit 100.

In some embodiments, in the case where the sub-pixel P where the pixel circuit 100 is located displays the medium and high gray scales, the light-emitting device L may be controlled to emit light through the first conductive path. In this case, the display phase of a frame may include a reset period S1*a*, a data writing and compensation period S2*a*, and a light-emitting period S3*a*.

In the reset period S1*a*, the scanning signal is at a low level, the enable signal is at a low level, and the reset signal is at a high level.

In response to the reset signal received at the reset signal terminal Rst, the fourth transistor T4 in the first reset circuit 11 is turned on, and transmits the second voltage signal received at the second voltage signal terminal IVDD to the first node N1 to reset the first node N1, i.e., to reset the control electrode of the sixth transistor T6 and the first electrode of the second capacitor C2. Since the second voltage signal is at the high level, in this case, the voltage of the first node N1 is raised to a high voltage, and the sixth transistor T6 in the first driving sub-circuit 13 may be turned on under the control of the voltage of the first node N1.

It will be noted that, as shown in FIG. 10, in the case where the pixel circuit 100 further includes the second reset circuit 50, in the reset period S1*a*, the driving method further includes: in response to the reset signal received at the reset signal terminal Rst, the tenth transistor T10 in the second reset circuit 50 being turned on, and transmitting the second voltage signal received at the second voltage signal terminal IVDD to the light-emitting device L to reset the light-emitting device L.

In the data writing and compensation period S2*a*, the scanning signal is at a high level, the enable signal is at a low level, and the reset signal is at a low level. The voltage value of the first data signal is related to a gray scale required to be displayed specifically. For example, the voltage value of the first data signal may be a large value in the range of VDL to VDH, inclusive, as long as the voltage value of the first data signal can enable the sixth transistor T6 to be turned on subsequently. The voltage value of the second data signal may be a small value in the range of VDL to VDH, inclusive, as long as the voltage value of the second data signal can enable second transistor T2 to be turned off.

In response to the reset signal, the fourth transistor T4 is turned off, and stops transmitting the second voltage signal to the first node N1. Since the second capacitor C2 is charged during a process of resetting the first node N1 by the fourth transistor T4, the second capacitor C2 starts to discharge after the fourth transistor T4 is turned off, so that the voltage of the first node N1 is maintained at the high voltage, and in turn, the sixth transistor T6 is maintained in the turn-on state.

In response to the scanning signal received at the scanning signal terminal Gate, the first driving circuit 10 is turned on, and writes the first data signal received at the first data signal terminal Data1 into the first node N1.

Here, a process of writing the first data signal into the first node N1 by the first driving circuit 10 may be that, in response to the scanning signal, the fifth transistor T5 in the first data writing circuit 12 and the seventh transistor T7 in the compensation circuit 14 are turned on simultaneously, the fifth transistor T5 may write the first data signal into the fourth node N4, the sixth transistor T6 may transmit the first data signal from the fourth node N4 to the fifth node N5, and the seventh transistor T7 may transmit the first data signal from the fifth node N5 to the first node N1. In the process of writing the first data signal into the first node N1, the threshold voltage of the sixth transistor T6 may be compensated, so that the voltage of the first node N1 is changed to a sum of $V_{Data1}$ and $V_{th\_tft6}$ ($V_{Data1}+V_{th\_tft6}$), in which $V_{Data1}$ represents the voltage value of the first data signal, and $V_{th\_tft6}$ represents the threshold voltage of the sixth transistor T6.

In the light-emitting period S3, the scanning signal is at the low level, the enable signal is at a high level, and the reset signal is at the low level.

In response to the enable signal received at the enable signal terminal EM, the first control circuit 20 is turned on, transmits the first voltage signal from the first voltage signal terminal LVSS to the first driving circuit 10, and transmits the first driving signal generated by the first driving circuit 10 according to the voltage of the first node and the first voltage signal transmitted by the first voltage signal terminal LVSS to the light-emitting device L to control the light-emitting brightness of the light-emitting device.

Here, a process of generating the first driving signal may be that, the eighth transistor T8 and the ninth transistor T9 in the first control circuit 20 are turned on simultaneously, and a voltage difference Vast between the control electrode and the first electrode of the sixth transistor T6 is a difference between the voltage value of the first node N1 and the voltage value of the fourth node N4, i.e., $V_{gs1}=V_{Data1}+V_{th\_tft6}-V_{LVSS}$, in which $V_{LVSS}$ represents the voltage value of the first voltage signal.

In this case, the first driving signal (i.e., a first current 11) transmitted to the light-emitting device L is:

$$I1=\frac{1}{2}k(V_{gs1}-V_{th\_tft6})^2=\frac{1}{2}k(V_{Data1}-V_{LVSS})^2,$$

$$k=\frac{W}{L}\times C\times u,\ \frac{W}{L}$$

is a width-to-length ratio of the sixth transistor T6, C is a capacitance of a channel insulating layer, and u is a channel carrier mobility.

It can be seen from the above that, the first driving signal transmitted to the light-emitting device L is related to only the voltage value of the first data signal and the voltage value of the first voltage signal, and is not related to the threshold voltage $V_{th\_tft6}$ of the sixth transistor T6. By compensating the threshold voltage of the sixth transistor T6, influence of the threshold voltage of the sixth transistor T6 on the first driving signal may be eliminated, thereby eliminating influence of the threshold voltage on operation situation (e.g., the light-emitting brightness) of the light-emitting device L, and improving accuracy of the light-emitting brightness of the light-emitting device L.

In some embodiments, in the case where the sub-pixel P where the pixel circuit 100 is located displays the low gray scale, the light-emitting device L may be controlled to emit light through the second conductive path. In this case, a display phase of a frame may include a data writing period S2*b* and a light-emitting period S3*b*.

Here, in the case where the pixel circuit 100 further includes the second reset circuit 50, the display phase of the frame further includes a reset period S1*b*.

In the reset period S1*b*, the scanning signal is at the low level, the enable signal is at the low level, and the reset signal is at the high level.

In response to the reset signal received at the reset signal terminal Rst, the tenth transistor T10 in the second reset circuit 50 is turned on, and transmits the second voltage signal received at the second voltage signal terminal IVDD to the light-emitting device L to reset the light-emitting device L.

In the data writing period S2*b*, the scanning signal is at the high level, and the enable signal is at the low level. The voltage value of the second data signal is related to the gray scale required to be displayed specifically. For example, the voltage value of the second data signal may be a large value in the range of VDL to VDH, inclusive, as long as the voltage value of the second data signal can enable the second transistor T2 to be turned on subsequently. The voltage value of the first data signal may be a small value in the range of VDL to VDH, inclusive, as long as the voltage value of the first data signal can enable the sixth transistor T6 to be turned off.

In response to the scanning signal received at the scanning signal terminal Gate, the second driving circuit 30 is turned on, and writes the second data signal received at the second data signal terminal Data2 into the second node N2.

Here, a process of writing the second data signal into the second node N2 may be that, in response to the scanning signal, the first transistor T1 in the second data writing circuit 31 is turned on, and writes the second data signal into the second node N2. Since the second data signal is at the high level, in this case, the second node N2 may be charged by using the second data signal, so that the voltage of the second node N2 is at the high voltage. In this case, the voltage of the second node N2 is $V_{Data2}$, in which $V_{Data2}$ represents the voltage value of the second data signal.

In the light-emitting period S3*b*, the scanning signal is at the low level, and the control signal is a high-frequency pulse signal.

In response to the control signal received at the control signal terminal HF, the second control circuit 40 is turned on, and transmits the second driving signal generated by the second driving circuit 30 according to the voltage of the second node and the first voltage signal transmitted by the first voltage signal terminal LVSS to the light-emitting device L to control the light-emitting brightness and the light-emitting duration of the light-emitting device L.

Here, the process of generating the second driving signal may be that, in the case where the control signal is at the high level, the third transistor T3 in the second control circuit 40 is turned on in response to the control signal, and a voltage difference $V_{gs2}$ between the control electrode and the first electrode of the second transistor T2 is a difference between the voltage value of the second node N2 and the voltage value of the first voltage signal, i.e., $V_{gs2}=V_{Data2}-V_{LVSS}$.

In this case, the second driving signal (i.e., a second current 12) transmitted to the light-emitting device L is:

$$I2=\frac{1}{2}k(V_{gs2}-V_{th\_tft2})^2=\frac{1}{2}k(V_{Data2}-V_{LVSS}-V_{th\_tft2})^2,$$

in which $V_{th\_tft2}$ represents a threshold voltage of the second transistor T2.

The second driving signal may control the light-emitting brightness of the light-emitting device L. In a case where the control signal is changed to be at a low level, in response to the control signal, the third transistor T3 is turned off, and stops transmitting the second driving signal to the light-emitting device L. The control signal controls the frequency at which the third transistor T3 is turned on and controls a sub-duration during which the second driving signal is transmitted to the light-emitting device L each time, so that the total duration during which the light-emitting device L emits light may be controlled.

It will be noted that, in the case where the sub-pixel P where the pixel circuit 100 is located displays the medium and high gray scales, in the data writing and compensation period S2*a*, the voltage value of the second data signal may be a large voltage value in the range of VDL to VDH, inclusive, as long as the voltage value of the second data signal can enable the second transistor T2 to be turned on.

In this way, in the light-emitting period S3*a*, in the process where the first control circuit 20 is turned on, and transmits the first driving signal generated by the first driving circuit 10 according to the voltage of the first node N1 and the first voltage signal transmitted by the first voltage signal terminal LVSS to the light-emitting device L, the second control circuit 40 may also be turned on and transmits the second driving signal generated by the second driving circuit 30 according to the voltage of the second node N2 and the first voltage signal transmitted by the first voltage signal terminal LVSS to the light-emitting device L.

Based on this, the first driving signal and the second driving signal may be simultaneously transmitted to the light-emitting device L, and a driving signal flowing through the light-emitting device L is a sum of the first driving signal and the second driving signal, i.e., I1+I2.

In this way, it is possible to facilitate to increase the current value of the driving signal transmitted to the light-emitting device L, and to improve the light-emitting brightness of the light-emitting device L, so that the sub-pixel P may display a higher gray scale. Moreover, by using the second driving signal, the accuracy of the gradient of change in the light-emitting brightness of the light-emitting device L may be improved, so that change of the gray scale displayed by the sub-pixel P is subtler.

Here, for the process of generating the first driving signal and the process of generating the second driving signal, reference may be made to the description in some embodiments described above, and details will not be repeated herein.

The method for driving the pixel circuit 100 has same beneficial effects as the pixel circuit 100, and thus details will not be repeated herein.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel circuit, comprising:

a first driving circuit electrically connected to at least a scanning signal terminal, a first data signal terminal, a first voltage signal terminal and a first node, the first driving circuit being configured to write a first data signal received at the first data signal terminal into the first node in response to a scanning signal received at the scanning signal terminal;

a first control circuit electrically connected to an enable signal terminal, the first voltage signal terminal and the first driving circuit, the first control circuit being configured to be further electrically connected to a light-emitting device, wherein the first control circuit is further configured to transmit a first voltage signal from the first voltage signal terminal to the first driving circuit, and to transmit a first driving signal generated by the first driving circuit according to a voltage of the first node and the first voltage signal transmitted by the first voltage signal terminal to the light-emitting device in response to an enable signal received at the enable signal terminal;

a second driving circuit electrically connected to at least the scanning signal terminal, a second data signal terminal, a second node and the first voltage signal terminal, the second driving circuit being configured to write a second data signal received at the second data signal terminal into the second node in response to the scanning signal; and a second control circuit electrically connected to a control signal terminal and the second driving circuit, the second control circuit being configured to be further electrically connected to the light-emitting device, wherein the second control circuit is further configured to transmit a second driving signal generated by the secondi driving circuit according to a voltage of the second node and the first voltage signal from the first voltage signal terminal to the light-emitting device in response to a control signal received at the control signal terminal.

2. The pixel circuit according to claim 1, wherein the second driving circuit includes:

a second data writing circuit electrically connected to the scanning signal terminal, the second data signal terminal and the second node, the second data writing circuit being configured to write the second data signal into the second node in response to the scanning signal; and a second driving sub-circuit electrically connected to the second node, a third node and the first voltage signal terminal, the second driving sub-circuit being configured to generate the second driving signal according to the voltage of the second node and the first voltage signal from the first voltage signal terminal, and to transmit the second driving signal to the third node under control of the voltage of the second node.

3. The pixel circuit according to claim 2, wherein the second data writing circuit includes a first transistor;

a control electrode of the first transistor is electrically connected to the scanning signal terminal, a first electrode of the first transistor is electrically connected to the second data signal terminal, and a second electrode of the first transistor is electrically connected to the second node.

4. The pixel circuit according to claim 2, wherein the second driving sub-circuit includes a second transistor and a first capacitor;

a control electrode of the second transistor is electrically connected to the second node, a first electrode of the second transistor is electrically connected to the first voltage signal terminal, and a second electrode of the second transistor is electrically connected to the third node;

a first electrode of the first capacitor is electrically connected to the second node, and a second electrode of the first capacitor is electrically connected to the first voltage signal terminal.

5. The pixel circuit according to claim 1, wherein the second control circuit includes a third transistor;

a control electrode of the third transistor is electrically connected to the control signal terminal, a first electrode of the third transistor is electrically connected to a third node, and a second electrode of the third transistor is configured to be electrically connected to the light-emitting device.

6. The pixel circuit according to claim 1, wherein the first driving circuit includes:

a first reset circuit electrically connected to a reset signal terminal, the first node and a second voltage signal terminal, the first reset circuit being configured to transmit a second voltage signal received at the second voltage signal terminal to the first node in response to a reset signal received at the reset signal terminal;

a first data writing circuit electrically connected to the scanning signal terminal, the first data signal terminal and a fourth node, the first data writing circuit being configured to write the first data signal into the fourth node in response to the scanning signal;

a first driving sub-circuit electrically connected to the fourth node, a fifth node, the first node and the first voltage signal terminal; and a compensation circuit electrically connected to the scanning signal terminal, the fifth node and the first node, the compensation circuit being configured to electrically connect the fifth node to the first node in response to the scanning signal, wherein the first driving sub-circuit is configured to transmit the first data signal received at the fourth node to the first node when the fifth node is electrically connected to the first node, and store the voltage of the first node; and the first driving sub-circuit is further configured to generate the first driving signal according to the voltage of the first nod and the first voltage signal transmitted to the fourth node.

7. The pixel circuit according to claim 6, wherein the first reset circuit includes a fourth transistor;

a control electrode of the fourth transistor is electrically connected to the reset signal terminal, a first electrode of the fourth transistor is electrically connected to the second voltage signal terminal, and a second electrode of the fourth transistor is electrically connected to the first node.

8. The pixel circuit according to claim 6, wherein the first data writing circuit includes a fifth transistor;

a control electrode of the fifth transistor is electrically connected to the scanning signal terminal, a first electrode of the fifth transistor is electrically connected to the first data signal terminal, and a second electrode of the fifth transistor is electrically connected to the fourth node.

9. The pixel circuit according to claim 6, wherein the first driving sub-circuit includes a sixth transistor and a second capacitor;

a control electrode of the sixth transistor is electrically connected to the first node, a first electrode of the sixth transistor is electrically connected to the fourth node, and a second electrode of the sixth transistor is electrically connected to the fifth node; and a first electrode of the second capacitor is electrically connected to the first node, and a second electrode of the second capacitor is electrically connected to the first voltage signal terminal, and/or the compensation circuit includes a seventh transistor;

a control electrode seventh transistor is electrically connected to the scanning signal terminal, a first electrode of the seventh transistor is electrically connected to the fifth node, and a second electrode of the seventh transistor is electrically connected to the first node.

10. The pixel circuit according to claim 6, wherein the first control circuit includes an eighth transistor and a ninth transistor;

a control electrode of the eighth transistor is electrically connected to the enable signal terminal, a first electrode of the eighth transistor is electrically connected to the fifth node, and a second electrode of the eighth transistor is configured to be electrically connected to the light-emitting device;

a control electrode of the ninth transistor is electrically connected to the enable signal terminal, a first electrode of the ninth transistor is electrically connected to the first voltage signal terminal, and a second electrode of the ninth transistor is electrically connected to the fourth node.

11. The pixel circuit according to claim 1, further comprising a second reset circuit, wherein the second reset circuit is electrically connected to a reset signal terminal and a second voltage signal terminal; the second reset circuit is configured to be further electrically connected to the light-emitting device, and to transmit a second voltage signal received at the second voltage signal terminal to the light-emitting device in response to a reset signal received at the reset signal terminal.

12. The pixel circuit according to claim 11, wherein the second reset circuit includes a tenth transistor;

a control electrode of the tenth transistor is electrically connected to the reset signal terminal, a first electrode of the tenth transistor is electrically connected to the second voltage signal terminal, and a second electrode of the tenth transistor is configured to be electrically connected to the light-emitting device.

13. The pixel circuit according to claim 1, wherein the pixel circuit includes a plurality of transistors, the plurality of transistors are of a same type.

14. The pixel circuit according to claim 13, wherein the plurality of transistors are all oxide transistors.

15. A driving method for a pixel circuit, applied to the pixel circuit according to claim 1, the driving method comprising:

in response to the scanning signal received at the scanning signal terminal, the first driving circuit being turned on, and writing the first data signal received at the first data signal terminal into the first node; and in response to the enable signal received at the enable signal terminal, the first control circuit being turned on, and transmitting the first voltage signal from the first voltage signal terminal to the first driving circuit, and transmitting the first driving signal generated by the first driving circuit according to the voltage of the first node and the first voltage signal transmitted by the first voltage signal terminal to the light-emitting device; and/or in response to the scanning signal received at the scanning signal terminal, the second driving circuit being turned on and, writing the second data signal received at the second data signal terminal into the second node; and in response to the control signal received at the control signal terminal, the second control circuit being turned on, and transmitting the second driving signal generated by the second driving circuit according to the voltage of the second node and the first voltage signal transmitted by the first voltage signal terminal to the light-emitting device.

16. The driving method for the pixel circuit according to claim 15, wherein the first driving circuit includes: a first reset circuit electrically connected to a reset signal terminal, the first node and a second voltage signal terminal, a first data writing circuit electrically connected to the scanning signal terminal, the first data signal terminal and a fourth node, a first driving sub-circuit electrically connected to the fourth node, a fifth node, the first node and the first voltage signal terminal, and a compensation circuit electrically connected to the scanning signal terminal, the fifth node and the first node;

the driving method further comprises:

in response to a reset signal received at the reset signal terminal, the first reset circuit being turned on, and transmitting a second voltage signal received at the second voltage signal terminal to the first node; wherein the first driving circuit writing the first date signal received at the first data signal terminal into the first node and generating the first driving signal according to the voltage of the first node and the first voltage signal, includes;

in response to the scanning signal, the first data writing circuit being turned on, and writing the first data signal to the fourth node;

in response to the scanning signal, the compensation circuit being turned on, and making the fifth node to be connected to the first node, so that the first data signal received at the fourth node is transmitted to the first node; and under control of the voltage of the first node, the first driving sub-circuit being turned on, and generate the first driving signal according to the voltage of the first node and the first voltage signal transmitted to the fourth node.

17. The driving method for the pixel circuit according to claim 15, wherein a range of a voltage value of the first data signal is same as a range of a voltage value of the second data signal.

18. A display substrate, comprising:

a plurality of pixel circuits each according to claim 1; and a light-emitting device electrically connected to each pixel circuit.

19. A display apparatus, comprising the display substrate according to claim 18.

20. The display apparatus according to claim 19, further comprising a source driver chip, wherein the source driver chip is electrically connected to the first data signal terminal and the second data signal terminal.

* * * * *